US012148211B2

United States Patent
Takahashi et al.

(10) Patent No.: US 12,148,211 B2
(45) Date of Patent: Nov. 19, 2024

(54) IMAGE PROCESSING APPARATUS AND 3D MODEL GENERATION METHOD

(71) Applicant: SONY GROUP CORPORATION, Tokyo (JP)

(72) Inventors: Hiroaki Takahashi, Tokyo (JP); Tetsuya Fukuyasu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 454 days.

(21) Appl. No.: 17/594,052

(22) PCT Filed: Mar. 27, 2020

(86) PCT No.: PCT/JP2020/014171
§ 371 (c)(1),
(2) Date: Sep. 30, 2021

(87) PCT Pub. No.: WO2020/209108
PCT Pub. Date: Oct. 15, 2020

(65) Prior Publication Data
US 2022/0172474 A1    Jun. 2, 2022

(30) Foreign Application Priority Data

Apr. 12, 2019    (JP) .................. 2019-076107

(51) Int. Cl.
*G06V 20/40*        (2022.01)
*G06T 17/00*        (2006.01)
(Continued)

(52) U.S. Cl.
CPC .............. *G06V 20/41* (2022.01); *G06T 17/00* (2013.01); *G06V 10/25* (2022.01); *H04N 13/189* (2018.05); *H04N 13/243* (2018.05)

(58) Field of Classification Search
None
See application file for complete search history.

(56) References Cited

U.S. PATENT DOCUMENTS 10,657,703 B2 *   5/2020   Higaki .................. G06T 15/205
11,039,083 B1 *   6/2021   Levin ........................ G06T 7/90
(Continued)

FOREIGN PATENT DOCUMENTS

| CN | 109196557 A | 1/2019 |
| CN | 109214265 A | 1/2019 |

(Continued)

OTHER PUBLICATIONS

International Search Report and Written Opinion of PCT Application No. PCT/JP2020/014171, issued on Jun. 16, 2020, 08 pages of ISRWO.

*Primary Examiner* — Vu Le
*Assistant Examiner* — Charles C L Penny
(74) *Attorney, Agent, or Firm* — CHIP LAW GROUP

(57) ABSTRACT

The present technology relates to an image processing apparatus, a 3D model generation method, and a program capable of reducing failed image capturing in multi-view image capturing for 3D model generation. The image processing apparatus includes a 3D region calculation unit that generates a 3D region of image capturing ranges generated from a plurality of multi-view images, and a determination unit that determines a situation in which an image capturing device captures a subject on the basis of a region image obtained by projecting the 3D region onto a specific viewpoint and a subject image from the image capturing device corresponding to the specific viewpoint. The present technology can be applied to, for example, an image processing apparatus for 3D model generation.

17 Claims, 16 Drawing Sheets

(51) Int. Cl.
*G06V 10/25* (2022.01)
*H04N 13/189* (2018.01)
*H04N 13/243* (2018.01)

(56) References Cited

U.S. PATENT DOCUMENTS

| | | |
|---|---|---|
| 2018/0101979 A1 | 4/2018 | Higaki et al. |
| 2018/0295289 A1 | 10/2018 | Taya |
| 2019/0014301 A1* | 1/2019 | Ota .................. G06T 7/564 |
| 2019/0098277 A1* | 3/2019 | Takama ............ G06T 15/20 |
| 2019/0098278 A1* | 3/2019 | Koizumi ............ H04N 23/80 |
| 2020/0322584 A1* | 10/2020 | Aizawa ............ G06F 9/4401 |

FOREIGN PATENT DOCUMENTS

| | | |
|---|---|---|
| JP | 2005-277603 A | 10/2005 |
| JP | 2009-074836 A | 4/2009 |
| JP | 2014-010805 A | 1/2014 |
| JP | 2018049591 A | 3/2018 |
| JP | 2018-063693 A | 4/2018 |
| JP | 2018194985 A * | 12/2018 |
| WO | 2018/150933 A1 | 8/2018 |

* cited by examiner

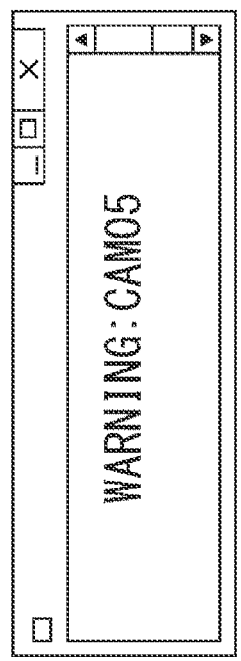
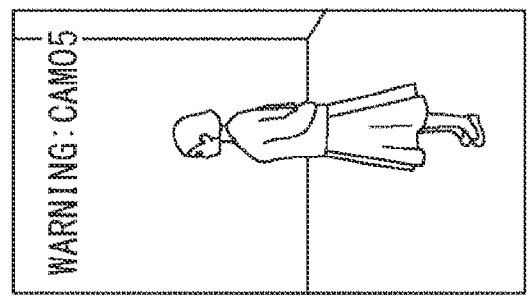
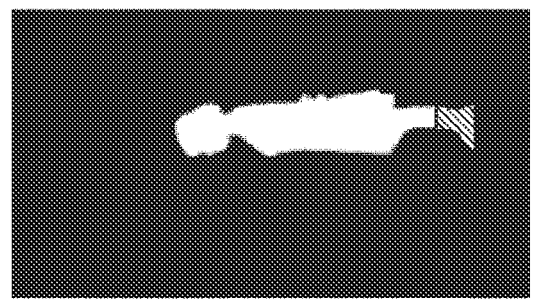

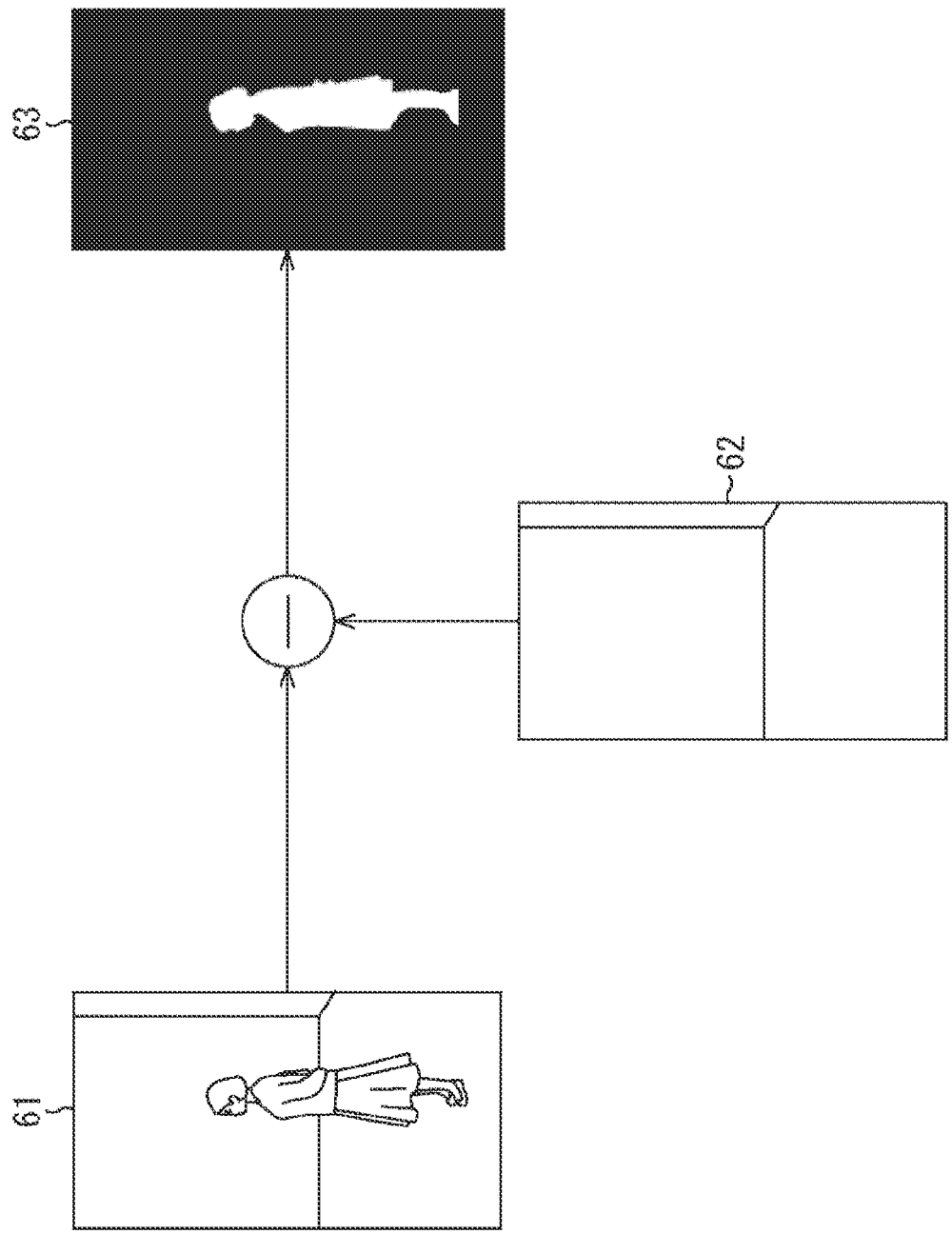

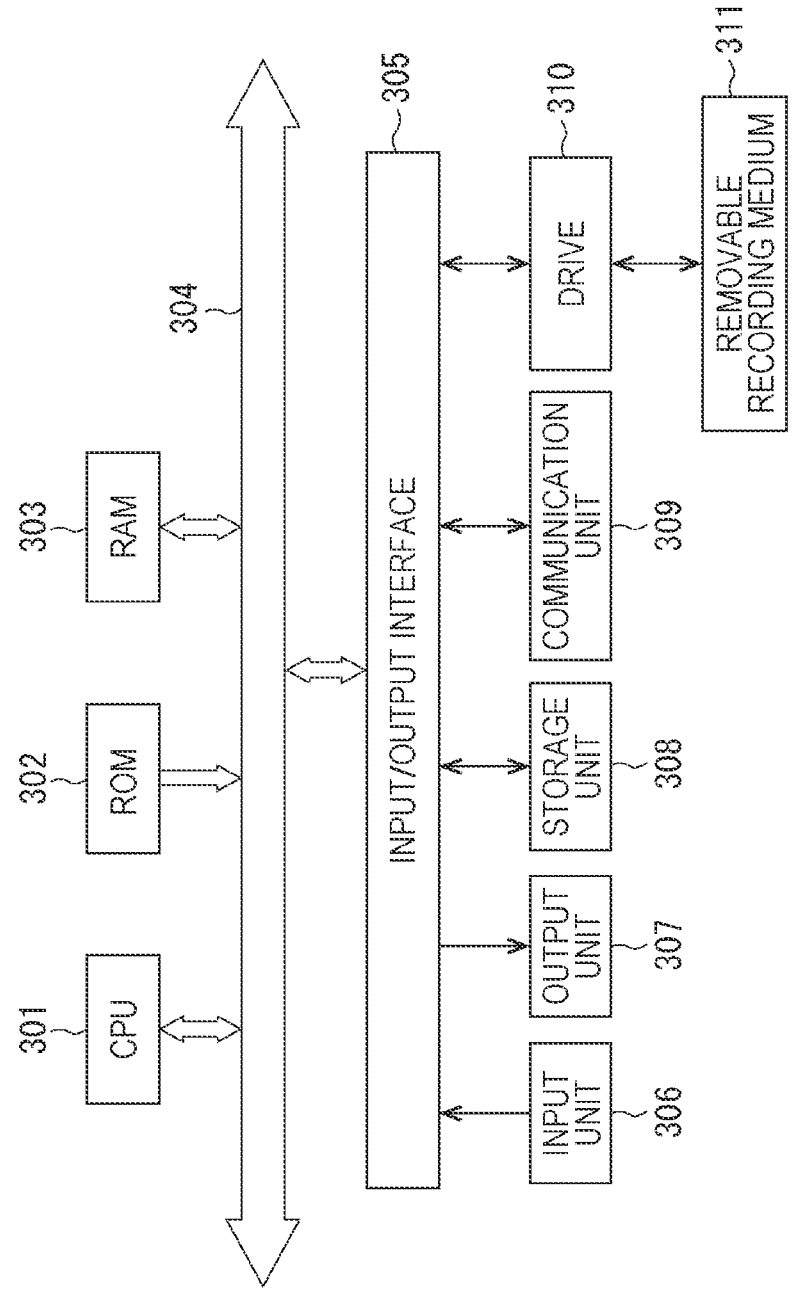

IMAGE PROCESSING APPARATUS AND 3D MODEL GENERATION METHOD

CROSS REFERENCE TO RELATED APPLICATIONS

This application is a U.S. National Phase of International Patent Application No. PCT/JP2020/014171 filed on Mar. 27, 2020, which claims priority benefit of Japanese Patent Application No. JP 2019-076107 filed in the Japan Patent Office on Apr. 12, 2019. Each of the above-referenced applications is hereby incorporated herein by reference in its entirety.

TECHNICAL FIELD

The present technology relates to an image processing apparatus, a 3D model generation method, and a program, and more particularly, to an image processing apparatus, a 3D model generation method, and a program capable of reducing failed image capturing in multi-view image capturing for 3D model generation.

BACKGROUND ART

There is a technology for generating a 3D model of a subject from moving images captured from multiple viewpoints and generating a virtual viewpoint image of the 3D model corresponding to an arbitrary viewing/listening position to provide an image from a free viewpoint. This technology is called a volumetric capture technology or the like.

In generation of the 3D model, a method, such as Visual Hull, for cutting out a three-dimensional shape of the subject using a plurality of captured images from different directions, is used (for example, refer to Patent Document 1). Since the accuracy of the 3D model is improved by increasing the number of cameras, it is preferable to capture images of the subject with multiple cameras from different directions.

CITATION LIST

Patent Document

Patent Document 1: WO 2018/150933 A

SUMMARY OF THE INVENTION

Problems to be Solved by the Invention

However, in a case where the number of cameras is large, there is a case where, when the subject moves, the subject is out of the image capturing range of a certain camera, and it is necessary to redo the image capturing.

The present technology has been made in view of such a situation, and is intended to reduce failed image capturing in multi-view image capturing for 3D model generation.

Solutions to Problems

An image processing apparatus according to one aspect of the present technology includes a generation unit that generates a 3D region of image capturing ranges generated from a plurality of multi-view images, and a determination unit that determines a situation in which an image capturing device captures a subject on the basis of a region image obtained by projecting the 3D region onto a specific viewpoint and a subject image from the image capturing device corresponding to the specific viewpoint.

A 3D model generation method according to one aspect of the present technology is a 3D model generation method for generating a 3D model of a subject, and includes generating a 3D region of image capturing ranges generated from a plurality of multi-view images, determining a situation in which an image capturing device captures the subject on the basis of a region image obtained by projecting the 3D region onto a specific viewpoint and a subject image from the image capturing device corresponding to the specific viewpoint, and generating the 3D model of the subject on the basis of the plurality of multi-view images.

A program according to one aspect of the present technology causes a computer to function as a generation unit that generates a 3D region of image capturing ranges generated from a plurality of multi-view images, and a determination unit that determines a situation in which an image capturing device captures a subject on the basis of a region image obtained by projecting the 3D region onto a specific viewpoint and a subject image from the image capturing device corresponding to the specific viewpoint.

In one aspect of the present technology, a 3D region of image capturing ranges generated from a plurality of multi-view images is generated, and a situation in which an image capturing device captures a subject is determined on the basis of a region image obtained by projecting the 3D region onto a specific viewpoint and a subject image from the image capturing device corresponding to the specific viewpoint.

Note that the image processing apparatus according to one aspect of the present technology can be achieved by causing a computer to execute a program. The program to be executed by the computer can be provided by being transmitted via a transmission medium or by being recorded on a recording medium.

The image processing apparatus may be an independent apparatus or an internal block constituting one apparatus.

BRIEF DESCRIPTION OF DRAWINGS

FIGS. 2A, 2B, and 2C are diagrams describing notification examples of the image processing system.

FIG. 7 is a diagram illustrating a processing example of a silhouette extraction unit.

FIG. 16 is a block diagram illustrating a configuration example of an embodiment of a computer to which the present technology has been applied.

MODE FOR CARRYING OUT THE INVENTION

Hereinafter, a mode for carrying out the present technology (hereinafter referred to as an embodiment) will be described. Note that description will be provided in the following order.

1. Configuration Example of Image Processing System
2. First Embodiment of Image Processing Apparatus
3. First Image Capturing Range Determination Processing
4. Second Embodiment of Image Processing Apparatus
5. Second Image Capturing Range Determination Processing
6. Third Embodiment of Image Processing Apparatus
7. Third Image Capturing Range Determination Processing
8. Other Examples of Camera Arrangement
9. Configuration Example of Computer 1. Configuration Example of Image Processing System FIG. 1 illustrates a configuration example of an image processing system to which the present technology has been applied.

Figure 1:
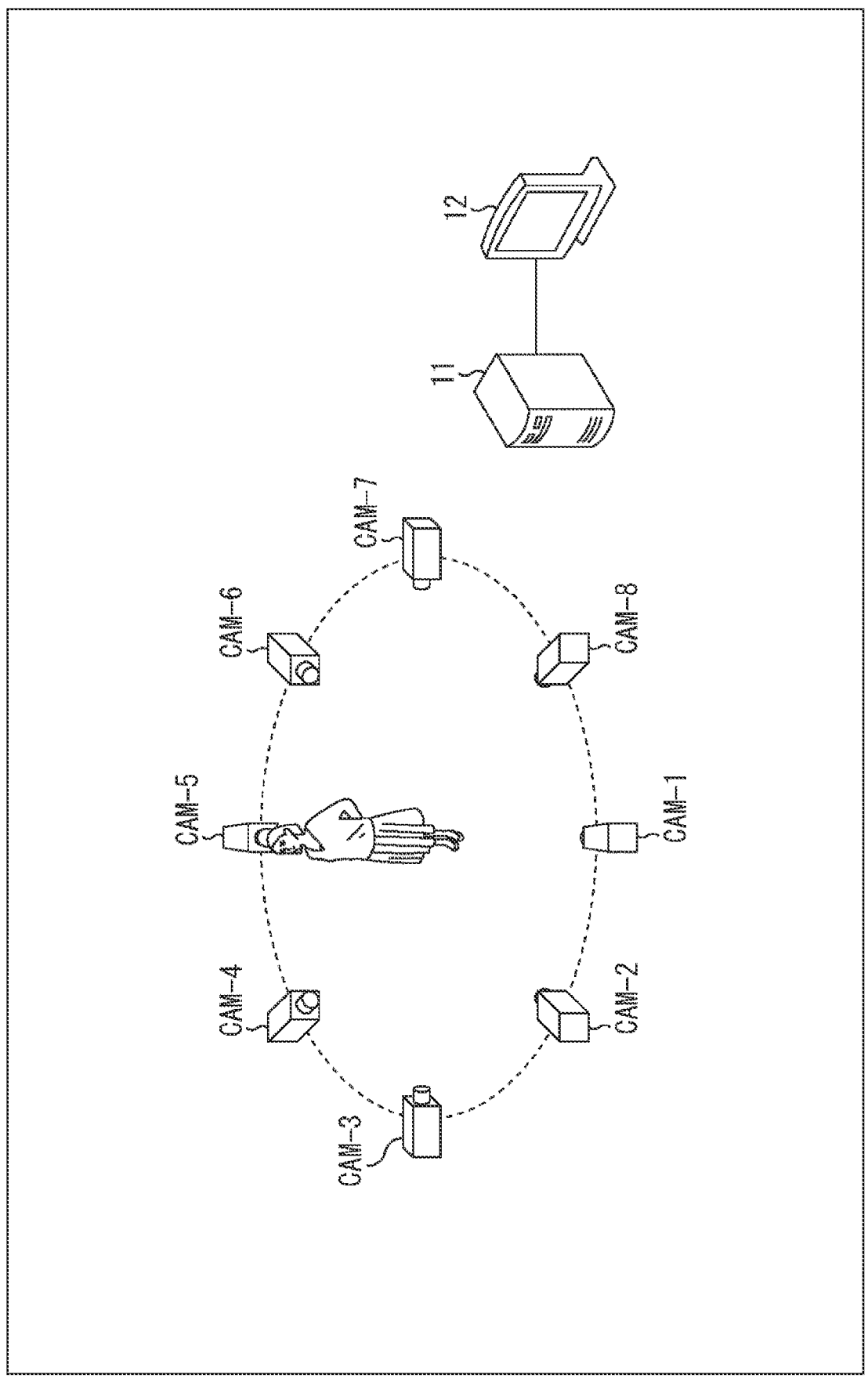
FIG. 1 illustrates a configuration example of an image processing system to which the present technology has been applied.

The image processing system in FIG. 1 includes N image capturing devices CAM-1 to CAM-N, an image processing apparatus 11, and a display device 12, for example.

As illustrated in FIG. 1, the image capturing devices CAM-1 to CAM-N(N>1) are arranged so as to surround a person who is a subject, capture images of the subject, and supply the captured images obtained as the result to the image processing apparatus 11. Captured images are sequentially supplied from the respective image capturing devices CAM to the image processing apparatus 11 as moving images or serial number still images. The plurality of captured images supplied from the image capturing devices CAM-1 to CAM-N is a plurality of multi-view images in which the subject is captured from different viewpoints. The example in FIG. 1 illustrates an example in which N=8 and in which eight image capturing devices CAM-1 to CAM-8 are arranged so as to surround the subject.

The image processing apparatus 11 generates a 3D model of an object which is the subject from a plurality of captured images supplied from the image capturing devices CAM-1 to CAM-N. The data of the generated 3D model of the object includes, for example, image data of the captured images of the subject obtained from the respective image capturing devices CAM and 3D shape data representing the 3D shape of the subject. The 3D shape data may be, for example, a depth image corresponding to captured images captured by the plurality of image capturing devices CAM, or is represented by a point cloud representing a three-dimensional position of the object using a set of points, a polygon mesh representing the three-dimensional position using connection between vertices, or the like.

The display device 12 displays a predetermined image supplied from the image processing apparatus 11.

Note that, instead of directly acquiring captured images from the image capturing devices CAM-1 to CAM-N, the image processing apparatus 11 can acquire the captured images once stored in a predetermined storage unit such as a data server to generate the 3D model of the object. Furthermore, the 3D model of the object can be generated by a combination of the captured images acquired from the image capturing devices CAM-1 to CAM-N and the captured images stored in the storage unit.

In the present embodiment, the moving image generated by each of the image capturing devices CAM includes a captured image (RGB image) including RGB wavelengths, but may include a multispectral image including an infrared (IR) image.

Furthermore, each of the image capturing devices CAM may perform image capturing a plurality of times while changing an image capturing condition such as an exposure condition, a light source position, and a light source color, and supply captured images obtained as the result to the image processing apparatus 11.

Moreover, each of the image capturing devices CAM may include a distance measuring sensor, measure the distance to the subject, generate not only an RGB captured image serving as texture information of the subject but also a depth image in which the distance to the subject is stored as a depth value in association with each pixel of the captured image, and supply the depth image to the image processing apparatus 11. Furthermore, the distance measuring sensor may be arranged independently of the respective image capturing devices CAM. In this case, the number of the image capturing devices CAM and the number of the distance measuring sensors (distance measuring devices) may be different.

The image processing apparatus 11 may be a server device on a cloud, and the display device 12 may be a device including a display such as a smartphone (mobile terminal). Communication may be performed between the plurality of image capturing devices CAM and the image processing apparatus 11 and between the image processing apparatus 11 and the display device 12 by direct connection or by connection via a predetermined network such as a local area network (LAN) and the Internet.

In generation of the 3D model of the object, since the accuracy of the 3D model is improved by increasing the number of the image capturing devices CAM, it is preferable to capture images of the subject with multiple image capturing devices CAM from different directions. However, in a case where the number of the image capturing devices CAM is large, there is a case where, when the subject moves, the subject is out of the image capturing range of one or more image capturing devices CAM, and it is necessary to redo the image capturing.

The image processing apparatus 11 can generate thumbnail images from the captured images transmitted from the N respective image capturing devices CAM during image capturing, and can display the thumbnail images on the display device 12. Note that the thumbnail images displayed on the display device 12 may be all thumbnail images corresponding to the captured images of the N respective image capturing devices CAM, or may be one thumbnail image (representative thumbnail image) corresponding to the captured image by one representative image capturing device CAM. Furthermore, a plurality of thumbnail images corresponding to a predetermined plurality of image capturing devices CAM may be used. The thumbnail image is an image obtained by reducing the resolution and the frame rate of the captured image obtained from the image capturing device CAM.

Furthermore, the image processing apparatus 11 can determine whether or not the subject is out of the image capturing range of a predetermined image capturing device CAM due to movement of the subject during image capturing, and can notify the user that the subject is out of the image capturing range. Here, the user is a person who is an image capturing person or a subject.

FIGS. 2A, 2B, and 2C illustrate a notification example in a case where the image processing apparatus 11 determines whether or not the subject is out of the image capturing range of a predetermined image capturing device CAM and notifies the user that the subject is out of the image capturing range.

A of FIG. 2A illustrates an example of notifying the user that the subject is out of the image capturing range of the image capturing device CAM-5 by displaying a message (characters) of "WARNING: CAM05" on the display device 12 as a dialog.

FIG. 2B illustrates an example of superimposing a message of "WARNING: CAM05" on the representative thumbnail image displayed on the display device 12 to notify the user that the subject is out of the image capturing range of the image capturing device CAM-5.

Note that, in a case where all the thumbnail images corresponding to the N image capturing devices CAM are displayed, a message of "WARNING" is only required to be superimposed on the thumbnail image of the image capturing device CAM in which the subject is out of the image capturing range to notify the user.

FIG. 2C illustrates an example of coloring a region of the subject that is out of the image capturing range in a silhouette image of the subject generated from the captured image obtained from a predetermined image capturing device CAM to notify the user that the colored region of the subject is out of the image capturing range.

The silhouette image is an image representing a region (subject region) of a subject that is an object to be drawn in silhouette, and is, for example, a binary image in which the pixel value of each pixel is binarized to "0" or "1". For example, in the silhouette image, a region of the subject has the pixel value set to "1" and is expressed in white, and a region other than the subject has the pixel value set to "0" and is expressed in black.

In the example in FIG. 2C, in the subject region of the silhouette image expressed in white, a foot region is colored in red, and the user is notified that the foot region is out of the image capturing range. Note that, in FIGS. 2A, 2B, and 2C, the red region is expressed by hatching due to drawing restrictions.

As described above, the image processing apparatus 11 has an image capturing range determination function of determining a positional relationship between a subject and an image capturing range and notifying (warning) the user when the subject is out of the image capturing range, in addition to an object generation function of generating a 3D model of an object using the subject as the object.

Note that, in terms of notification to the user when the subject is out of the image capturing range, the user may be notified in a case where the subject is out of the image capturing range in one image capturing device CAM, or in a case where a large number of image capturing devices CAM are provided, the user may be notified in a case where the subject is out of the image capturing range in a predetermined number or more of image capturing devices CAM set in advance. In this case, the number or more of devices for notification in a determination unit 36 as described later can be set (designated).

Furthermore, in the example of FIGS. 2A, 2B, and 2C, an example of giving notification that the subject is out of the predetermined image capturing range by displaying characters or images on the display device 12 has been described, but the notification may be given in another method. For example, the notification may be given by outputting a beep sound, or by outputting a speech such as "the subject is out of the range in the fifth camera" and "the feet go beyond the range". In a case where the notification is given by a sound such as a beep sound and a speech, a loudspeaker may be additionally provided, or a loudspeaker of the display device 12 may be used. In addition, both the screen display of the display device 12 and the sound output may be provided. Furthermore, instead of the immediate notification, the notification information may be stored in the storage unit together with the captured image so that the notification can be given afterwards. For example, the notification information can be embedded as tag information in the captured image or the 3D shape data, or a file storing the notification information can be generated and stored separately from the captured image and the 3D shape data. When the user looks at the captured image or the 3D model, the notification can be given by characters, images, sounds, or the like based on the tag information or the notification information included in the file.

Hereinafter, the image capturing range determination function by the image processing apparatus 11 will be described in detail. Note that the object generation function by the image processing apparatus 11 will be briefly described as being fulfilled using a general method.

2. First Embodiment of Image Processing Apparatus

Figure 3:
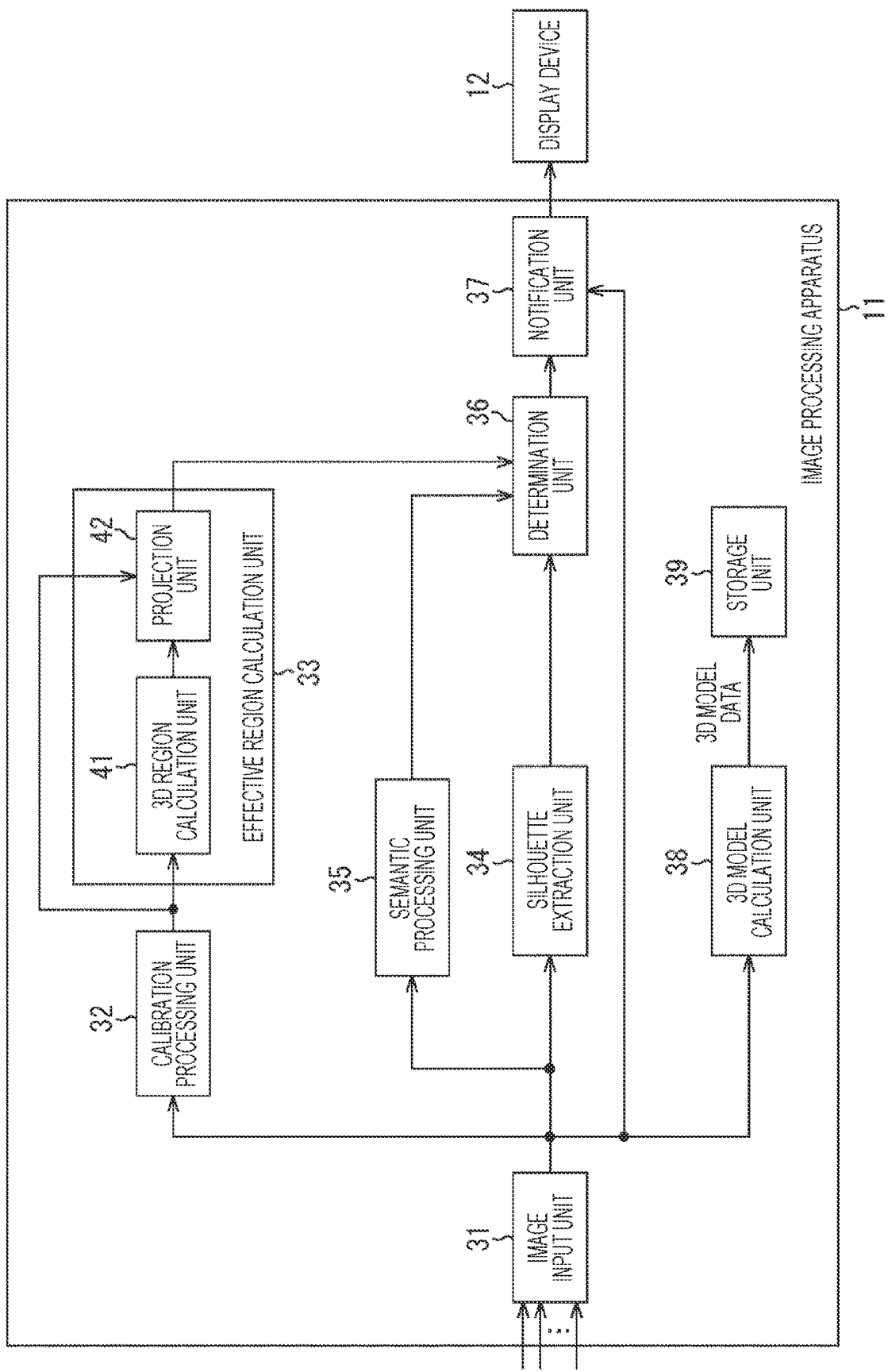
FIG. 3 is a block diagram illustrating a configuration example of a first embodiment of an image processing apparatus.

FIG. 3 is a block diagram illustrating a configuration example of a first embodiment of the image processing apparatus 11.

The image processing apparatus 11 includes an image input unit 31, a calibration processing unit 32, an effective region calculation unit 33, a silhouette extraction unit 34, a semantic processing unit 35, the determination unit 36, a notification unit 37, a 3D model calculation unit 38, and a storage unit 39. The effective region calculation unit 33 includes a 3D region calculation unit 41 and a projection unit 42. Note that the semantic processing unit 35 is provided as an option, and can be omitted.

The image input unit 31 acquires captured images transmitted from the N respective image capturing devices CAM. The captured images are sequentially input as moving images. The N captured images from the N respective image capturing devices CAM are supplied to the calibration processing unit 32, the silhouette extraction unit 34, the semantic processing unit 35, the notification unit 37, and the 3D model calculation unit 38.

The calibration processing unit 32 performs calibration processing of calculating camera parameters of the respective image capturing devices CAM on the basis of the N captured images captured by the N image capturing devices CAM. The calibration processing unit 32 performs the calibration processing using, for example, N captured images obtained by capturing a chessboard with a black and white lattice chess pattern by means of the N image capturing devices CAM. By the calibration processing, a characteristic parameter representing a characteristic of each of the N image capturing devices CAM alone and an external parameter representing a relationship with another image capturing device CAM are determined. The characteristic parameter representing a characteristic of the single image capturing device CAM includes, for example, internal parameters such as a focal length, a principal point, and an angle of view of the image capturing device CAM, and optical characteristic parameters such as distortion (aberration). The external parameter includes a relative coordinate value (relative position) of the self image capturing device CAM with respect to another image capturing device CAM.

Note that, in a case where the positions of the N image capturing devices CAM are fixed, all that is required prior to execution of the calibration processing is to capture the chessboard once before image capturing for generation of the 3D model. In a case where the positions of the image capturing devices CAM are moved, or the zoom (angle of view) or the like is changed, it is necessary to perform real-time calibration processing based on feature point detection of the subject or the like in addition to the calibration processing before start of image capturing.

Note that the calibration processing is not limited to the above-described method using a chessboard, and other methods may be used as long as the method enables the required parameters to be determined. Various parameters determined by the calibration processing are supplied to (the 3D region calculation unit 41 and the projection unit 42 of) the effective region calculation unit 33 as camera parameters.

The 3D region calculation unit 41 of the effective region calculation unit 33 calculates a 3D region included in the image capturing ranges of all the N image capturing devices CAM on the basis of the camera parameters supplied from the calibration processing unit 32.

Figure 4:
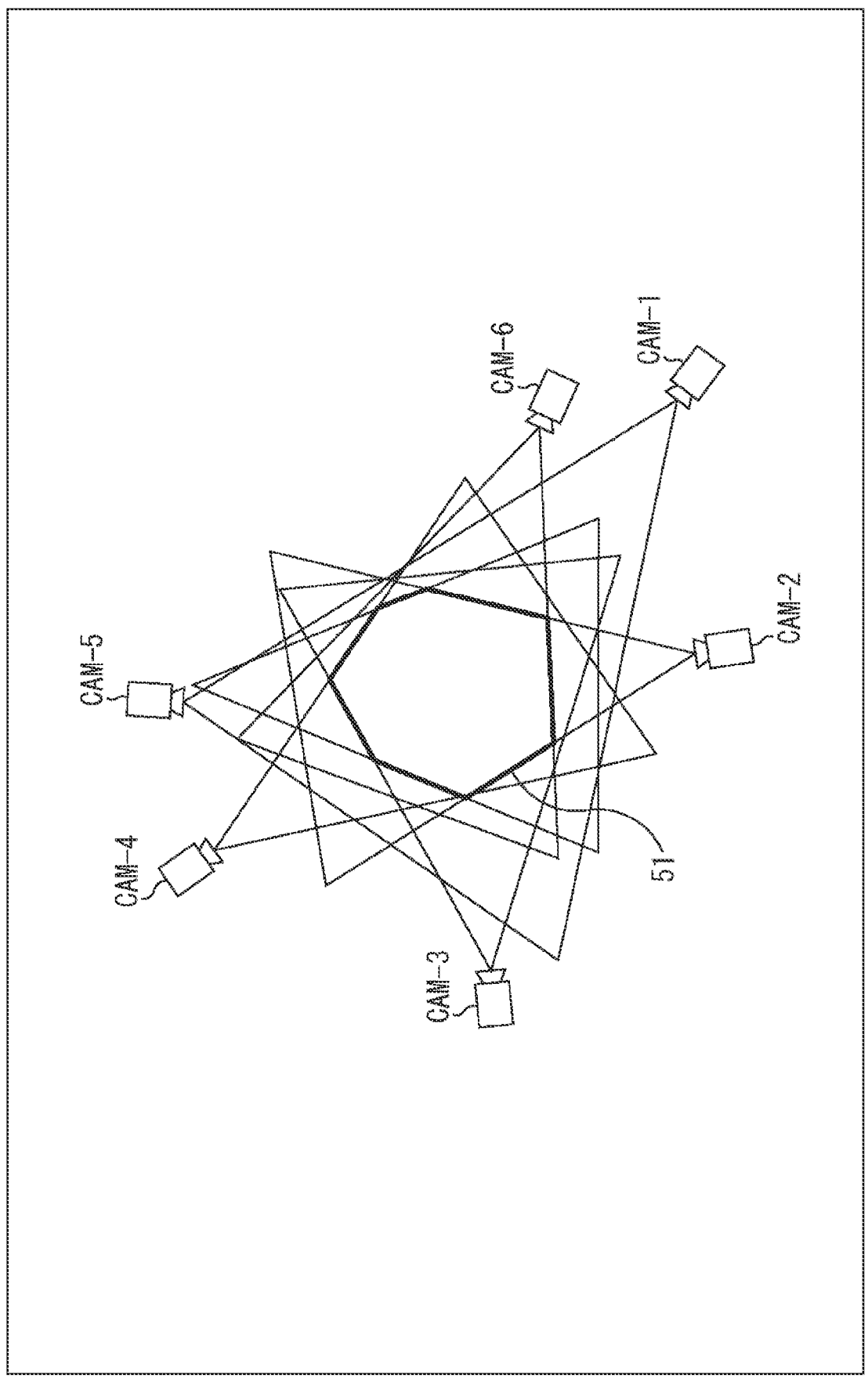
FIG. 4 is a diagram illustrating a processing example of calculating a 3D region.

FIG. 4 illustrates a processing example in which the 3D region calculation unit 41 calculates a 3D region 51, which is a region included in the image capturing ranges of six respective image capturing devices CAM-1 to CAM-6, with N=6.

As a method for calculating the 3D region included in the image capturing ranges of all the N image capturing devices CAM, for example, a method, such as Visual Hull, for projecting the image capturing ranges of the respective image capturing devices CAM in accordance with the camera parameters and cutting out a three-dimensional shape, can be used. Alternatively, the 3D region may be calculated using three-dimensional geometry or the like. Data representing the calculated 3D region is supplied to the projection unit 42 in a predetermined 3D data format such as a point cloud representing a three-dimensional position of the object using a set of points, voxel data representing a three-dimensional position of the object using a set of rectangular solid grids, and a polygon mesh representing a three-dimensional position of the object using connection between vertices.

The projection unit 42 is supplied with the 3D region included in the image capturing ranges of all the N image capturing devices CAM from the 3D region calculation unit 41 and the camera parameters from the calibration processing unit 32.

The projection unit 42 projects the 3D region from the 3D region calculation unit 41 onto a viewpoint of a predetermined image capturing device CAM serving as a target camera, and generates an effective region mask image (region image) represented as a binary image in which a region corresponding to the 3D region is set to white (pixel value "1") and a region other than the 3D region is set to black (pixel value "0"). Since the effective region mask image is generated for each of all the image capturing devices CAM with each of the N image capturing devices CAM as the target camera, as many effective region mask images as the number N of the image capturing devices CAM (that is, N images) are generated. Hereinafter, a region expressed in white in the effective region mask image is referred to as a projection 3D region.

Figure 5:
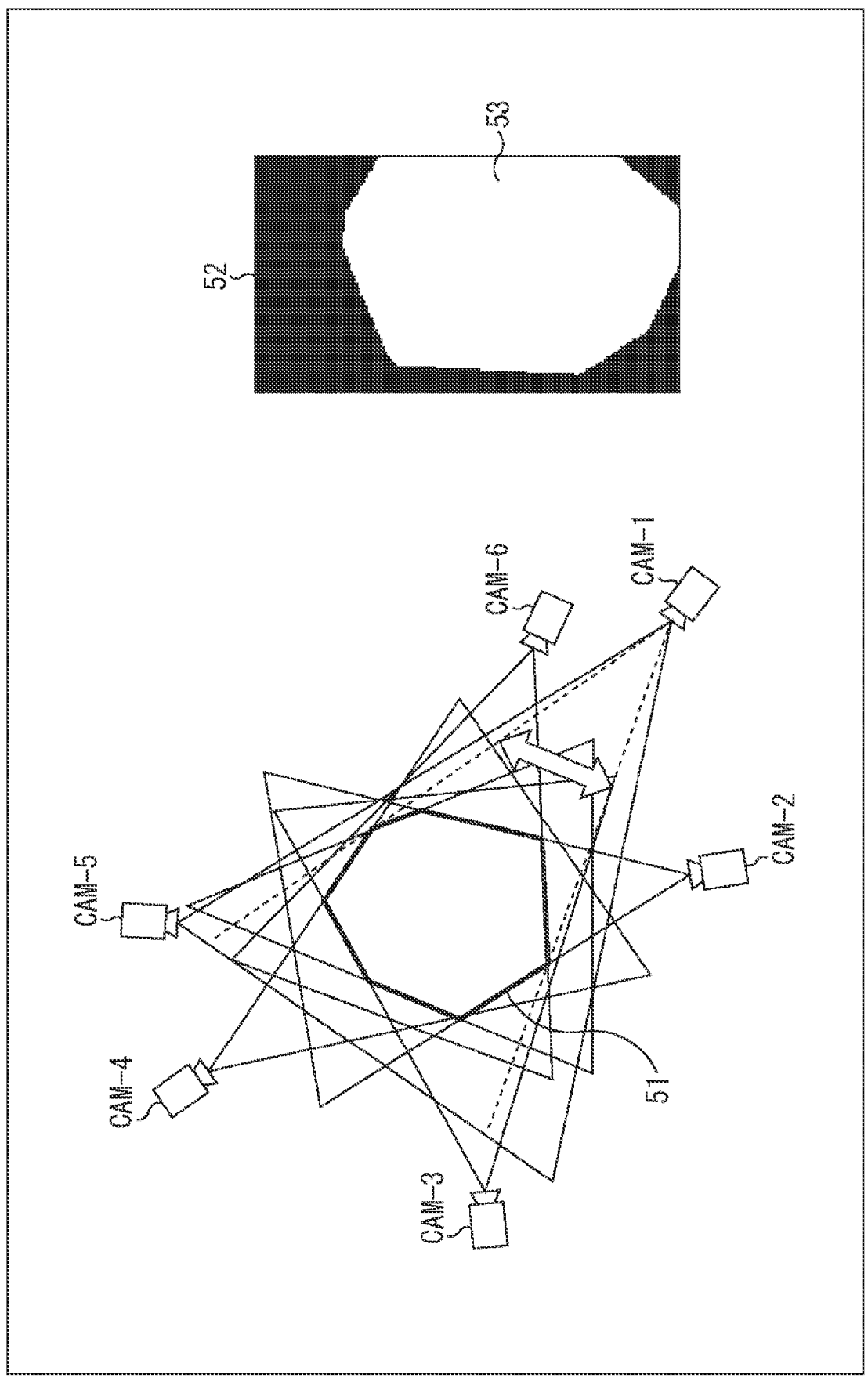
FIG. 5 is a diagram illustrating a processing example of an effective region mask image.

FIG. 5 illustrates an example of an effective region mask image 52 obtained by projecting the 3D region 51 corresponding to the six image capturing devices CAM-1 to CAM-6 illustrated in FIG. 4 onto the viewpoint of the target camera using the image capturing device CAM-1 as the target camera.

The effective region mask image 52 is represented as a binary image in which a projection 3D region 53 corresponding to the 3D region 51 is set to white (pixel value "1") and a region other than the projection 3D region 53 is set to black (pixel value "0") in the projection plane (image capturing range) obtained by projecting the 3D region 51 onto the viewpoint of the image capturing device CAM-1.

Moreover, the projection unit 42 can generate visual recognition camera information including number information indicating how many image capturing devices CAM can view the surface of the subject and camera information indicating which image capturing device CAM can view the surface of the subject.

Figure 6:
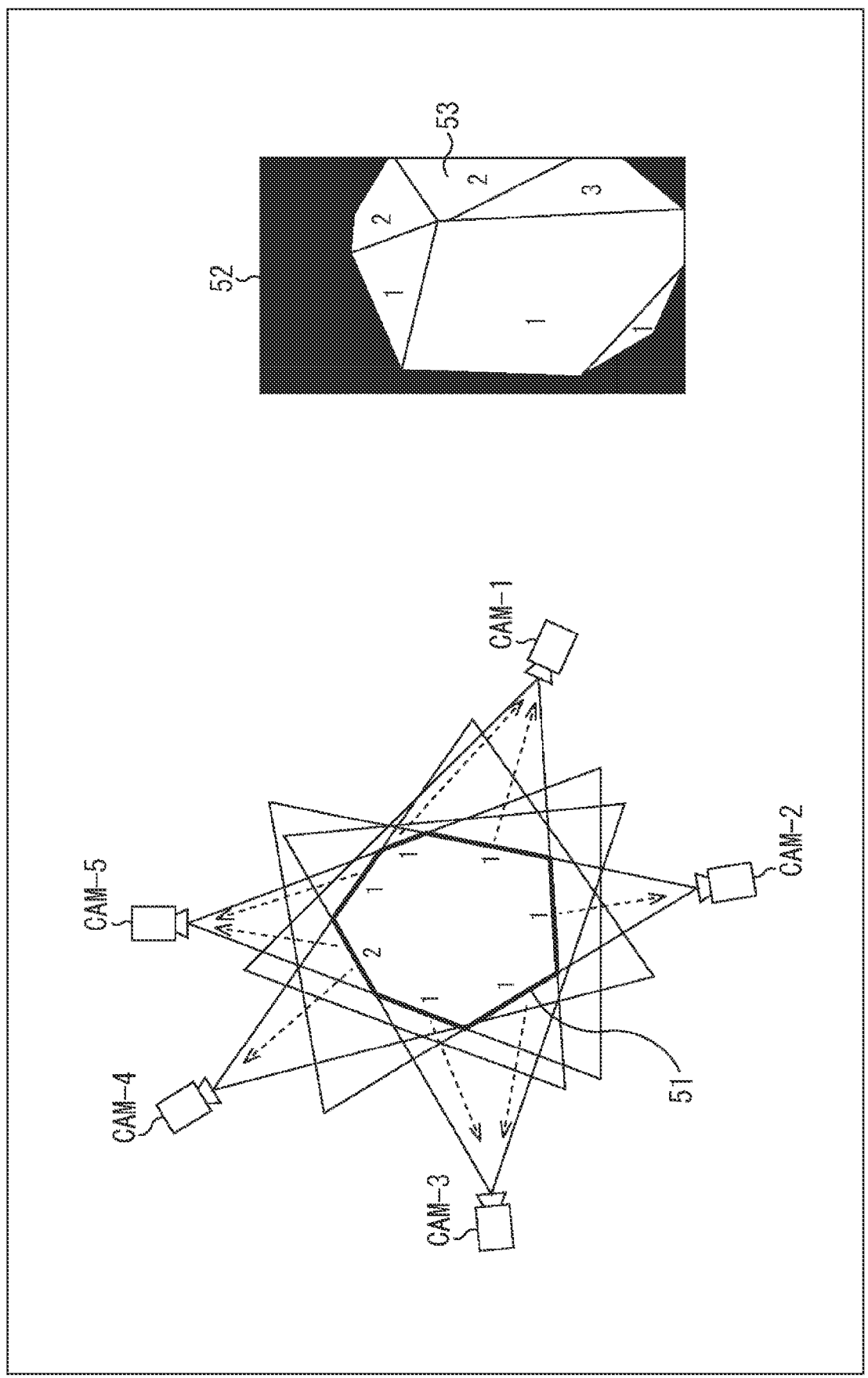
FIG. 6 is a diagram illustrating an example of visual recognition camera information.

FIG. 6 illustrates an example of the visual recognition camera information when images are captured by the five image capturing devices CAM-1 to CAM-5.

As illustrated in FIG. 6, the inside of the projection 3D region 53 of the effective region mask image 52 is divided according to the number of image capturing devices CAM that can view the surface of the subject. This number represents the number information indicating the number of image capturing devices CAM that can directly visually recognize the subject. By projecting respective points on the surface of the 3D region 51 onto the respective image capturing devices CAM, it can be determined if the target image capturing devices CAM can directly visually recognize the surface. By clarifying which image capturing devices CAM can view the surface of the subject (3D region 51), it is possible to count how many image capturing devices CAM can view the surface of the subject (3D region 51) in total.

Returning to FIG. 3, the projection unit 42 supplies the generated N effective region mask images and visual recognition camera information to the determination unit 36.

The silhouette extraction unit 34 generates, for each of the N captured images supplied from the image input unit 31, a silhouette image obtained by extracting the region of the subject that is an object to be drawn in silhouette. The generated silhouette image is supplied to the determination unit 36.

A detection method for detecting the silhouette of the subject in the texture image is not particularly limited, and any method can be employed. For example, as illustrated in FIG. 7, a silhouette image 63 can be generated by capturing and storing in advance a background image 62 in which only the background not including the subject is captured, and using a background subtraction method of taking a difference between a captured image 61 and the background image 62.

Furthermore, in a case where a depth image in which the distance to the subject is stored as a depth value is also acquired, the silhouette image can be generated by separating a foreground region, which is a subject region, from a background region on the basis of the distance information of the depth image.

Alternatively, the silhouette image may be generated by extracting a subject region from only one captured image using an image matting technology such as Graph Cut and chroma key.

The semantic processing unit 35 performs semantic segmentation processing of identifying semantic information of an object appearing as a subject in the captured image and adding the semantic information to each predetermined region. For example, in a case where the subject is a person, the semantic processing unit 35 can identify and classify the subject region of the entire person into respective parts such as the head, the hands (the right hand and the left hand), the arms (the right arm and the left arm), the feet (the right foot and the left foot), the torso, and the like by the semantic segmentation processing. In a case where the subject is not a person, the semantic processing unit 35 can identify the type of the object such as a ball, a racket, and a car and add the semantic information to it. The semantic processing unit 35 supplies the semantic information added to each predetermined region of the identified subject to the determination unit 36. Instance semantic segmentation, in which the semantic information includes individual information, may be performed. By utilizing the individual information, it is possible to perform processing focusing on the number of subjects such as one person and two persons or a specific subject, for example.

The determination unit 36 determines situations in which the respective image capturing devices CAM capture the subject on the basis of the N effective region mask images corresponding to the N image capturing devices CAM from the projection unit 42 and the N silhouette images supplied from the determination unit 36.

Specifically, the determination unit 36 performs another-camera determination processing and self-camera determination processing described below with each of the N image capturing devices CAM as a target camera. The determination unit 36 performs another-camera determination processing of determining whether or not the subject is out of the image capturing range of any image capturing device CAM other than the target camera by using a pair of the effective region mask image and the silhouette image corresponding to the image capturing device CAM serving as the target camera. Furthermore, the determination unit 36 performs self-camera determination processing of determining whether or not the subject is out of the image capturing range of the image capturing device CAM serving as the target camera by using the silhouette image corresponding to the image capturing device CAM serving as the target camera.

Figure 8B:
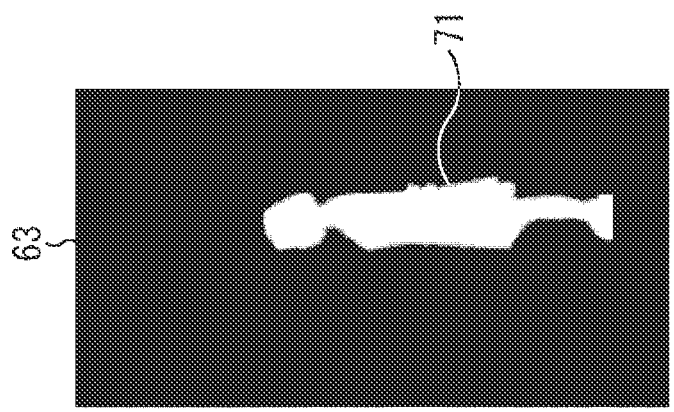
FIGS. 8A and 8B are diagrams describing camera determination processing of a determination unit.
Figure 8A:
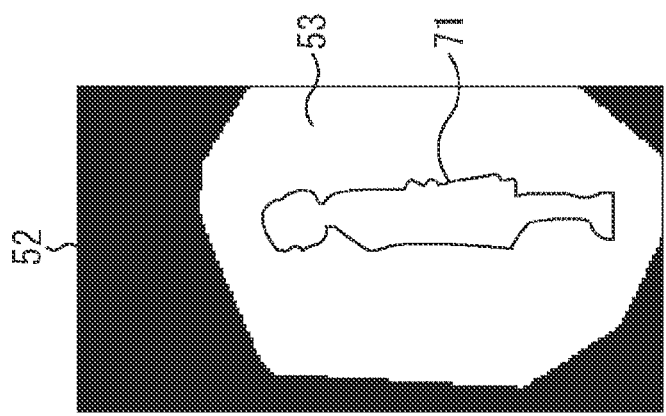

In the another-camera determination processing, as illustrated in FIG. 8A, the determination unit 36 compares, for each pixel of a subject region 71, whether or not the subject region 71 expressed in white in the silhouette image goes beyond the projection 3D region 53 expressed in white in the effective region mask image 52.

In the self-camera determination processing, as illustrated in FIG. 8B, the determination unit 36 compares, for each pixel of the subject region 71, whether or not the subject region 71 expressed in white in the silhouette image is in contact with four sides of the outer periphery of the silhouette image 63.

Note that, as described above, the semantic processing unit 35 can be provided as an option, and in a case where the semantic processing unit 35 is provided, the determination unit 36 can specify a part (for example, the right foot, the left hand, or the like) of the subject, an object (a ball), or the like going beyond the projection 3D region 53 by using semantic information from the semantic processing unit 35.

As determination information indicating determination results, the determination unit 36 supplies the notification unit 37 with a result of whether or not the subject is out of the image capturing range of each of the image capturing devices CAM serving as the target camera and device specification information indicating which image capturing device CAM is one in which the subject is out of the image capturing range in a case where the subject is out of the image capturing range. Note that the determination information may be supplied to the notification unit 37 on a constant basis, or may be supplied to the notification unit 37 only in a case where the subject is out of the image capturing range.

Furthermore, in a case where the semantic processing unit 35 is provided, the determination unit 36 can also supply the notification unit 37 with semantic specification information such as an object and a part of the subject which is out of the image capturing range as part of the determination information in a case where the subject is out of the image capturing range.

Moreover, as in FIGS. 2B and 2C, in a case where the notification unit 37 notifies the user that the subject is out of the image capturing range together with the captured image and the silhouette image, the silhouette image and the captured image of the target camera in which the subject is out of the image capturing range are also supplied from the determination unit 36 to the notification unit 37.

The notification unit 37 generates notification information for notifying the user that the subject is out of the image capturing range in the specific image capturing device CAM on the basis of the determination information from the determination unit 36, and outputs the notification information to the display device 12.

In the case of the dialog display illustrated in FIG. 2A, the notification information is display control information for displaying a message dialog including information indicating the image capturing device CAM in which the subject is out of the image capturing range. Furthermore, in the example in FIG. 2B or 2C, the notification information is display control information for displaying information indicating the image capturing device CAM in which the subject is out of the image capturing range and the silhouette image or the captured image. The silhouette image or the captured image can be subjected to reduction processing or the like as necessary, and can be output to the display device 12 as a thumbnail image.

Furthermore, in a case where a beep sound or a speech such as "the subject is out of the range in the fifth camera" is output to notify the user, the notification information is sound control information including an acoustic signal. The notification information may be both the screen display and the sound, or may be either one. In a case where the semantic processing unit 35 is provided, it is possible to provide notification such as "the feet go beyond the image capturing range", "the ball is out of the image capturing range", or the like. The display device 12 notifies the user that the subject is out of the image capturing range in the specific image capturing device CAM on the basis of the notification information from the notification unit 37.

The 3D model calculation unit 38 generates a 3D model of an object with the subject as the object using captured images of the subject supplied from the N respective image capturing devices CAM, and supplies data of the generated 3D model of the object (3D model data) to the storage unit 39.

For example, the 3D model calculation unit 38 extracts a difference between a captured image including the subject supplied from the image capturing device CAM and a background image, to generate a silhouette image in which the subject region is extracted. Then, the 3D model calculation unit 38 generates a 3D model of the object by means of a method such as Visual Hull by using a plurality of silhouette images in different directions and camera parameters of the N respective image capturing devices CAM. The silhouette images and the camera parameters may be acquired from the calibration processing unit 32 and the silhouette extraction unit 34, or may be calculated separately. Details of generation of the 3D model of the object are omitted herein.

The storage unit 39 stores the 3D model data generated in the 3D model calculation unit 38. The stored 3D model data is provided to a reproduction device or the like that reproduces the 3D model of the object as necessary, and is reproduced (restored) in the reproduction device.

The image processing apparatus 11 is configured as described above.

Note that the image capturing range determination function and the object generation function that can be executed in the image processing apparatus 11 may be achieved in different apparatuses instead of the same apparatus. In this case, the image processing apparatus 11 that executes the image capturing range determination function includes, for example, the image input unit 31, the calibration processing unit 32, the effective region calculation unit 33, the silhouette extraction unit 34, the semantic processing unit 35, the determination unit 36, and the notification unit 37. The image processing apparatus 11 that executes the object generation function includes, for example, the image input unit 31, the 3D model calculation unit 38, and the storage unit 39.

3. First Image Capturing Range Determination Processing

Next, first image capturing range determination processing performed by the first embodiment of the image processing apparatus 11 will be described with reference to the flowchart in FIG. 9. This processing is started at the same time as start of image capturing in the N image capturing devices CAM, for example.

First, in step S1, the image input unit 31 acquires captured images transmitted from the N respective image capturing devices CAM. The N acquired captured images are supplied to the calibration processing unit 32, the silhouette extraction unit 34, the semantic processing unit 35, the notification unit 37, and the 3D model calculation unit 38.

In step S2, the calibration processing unit 32 performs calibration processing of calculating camera parameters of the respective image capturing devices CAM on the basis of the N captured images captured by the N image capturing devices CAM. By this processing, a characteristic parameter (internal parameters and optical characteristic parameters) representing a characteristic of each of the image capturing devices CAM and an external parameter representing a relative positional relationship between the image capturing devices CAM are obtained.

In step S3, the 3D region calculation unit 41 calculates a 3D region included in the image capturing ranges of all the N image capturing devices CAM on the basis of the camera parameters supplied from the calibration processing unit 32.

In step S4, the projection unit 42 generates effective region mask images obtained by projecting the 3D region calculated in the 3D region calculation unit 41 onto viewpoints of the respective image capturing devices CAM. N effective region mask images, which are as many images as the number of image capturing devices CAM, are generated. Furthermore, the projection unit 42 can also generate visual recognition camera information representing number information indicating the number of the image capturing devices CAM that can view the image capturing range of the image capturing device CAM and camera information indicating which image capturing device CAM can view it. The generated N effective region mask images and the N pieces of visual recognition camera information are supplied to the determination unit 36.

In step S5, the silhouette extraction unit 34 generates N silhouette images from the N captured images supplied from the image input unit 31. The generated N silhouette images are supplied to the determination unit 36.

In step S6, the semantic processing unit 35 executes semantic segmentation processing on the N captured images supplied from the image input unit 31 to generate semantic information, and supplies the semantic information to the determination unit 36. This processing can be omitted in a case where it is not necessary to specify an object or a part of a person that is out of the image capturing ranges of the image capturing devices CAM.

In step S7, the determination unit 36 performs camera determination processing of determining whether or not the subject is out of the image capturing ranges of the image capturing devices CAM on the basis of the N effective region mask images from the projection unit 42 and the N silhouette images from the determination unit 36. More specifically, the determination unit 36 performs another-camera determination processing of determining whether or not the subject is out of the image capturing range of any image capturing device CAM other than the target camera, and self-camera determination processing of determining whether or not the subject is out of the image capturing range of the image capturing device CAM serving as the target camera. Determination information indicating determination results of the another-camera determination processing and the self-camera determination processing executed with each of the image capturing devices CAM as a target camera is supplied from the determination unit 36 to the notification unit 37.

In step S8, on the basis of the determination information from the determination unit 36, the notification unit 37 generates notification information for notifying the user that the subject is out of the image capturing range of a specific image capturing device CAM, and outputs the notification information to the display device 12. In a case where the subject is not out of the image capturing range of any image capturing device CAM, the notification information is not particularly required.

In step S9, on the basis of the notification information from the notification unit 37, the display device 12 notifies the user that the subject is out of the image capturing range of the specific image capturing device CAM.

At this time, the first image capturing range determination processing ends. According to the first image capturing range determination processing, since the user can be notified in a case where the subject is out of the image capturing ranges in the plurality of image capturing devices CAM capturing the subject, it is possible to reduce failed image capturing in multi-view image capturing for 3D model generation.

In the first image capturing range determination processing described above, the determination unit 36 determines whether or not the subject is out of the image capturing range of the image capturing device CAM. However, not only whether or not the subject is completely out of the image capturing range, the determination unit 36 may also determine whether or not the subject is about to be out of the image capturing range in a case where the subject moves a little more and notify the user. In this case, in a case where the subject region is out of a range smaller by a predetermined ratio (for example, 10%) than the projection 3D region 53 obtained by projecting the 3D region 51 calculated by the 3D region calculation unit 41 onto the viewpoint of the target camera, such a case can be regarded as a state in which the subject is about to be out of the image capturing range, and notification can be given. Alternatively, in a case where the motion vector of the subject is detected, and where the position of the subject predicted after a predetermined time period is out of the projection 3D region 53, such a case can be regarded as a state in which the subject is about to be out of the image capturing range, and notification can be given. Furthermore, in a case where the subject is out of the projection 3D region 53 by a specific amount, notification may be given, or in a case where it is detected that a specific part goes beyond the region on the basis of the semantic information obtained in the semantic processing unit 35, notification may be given.

Figure 9:
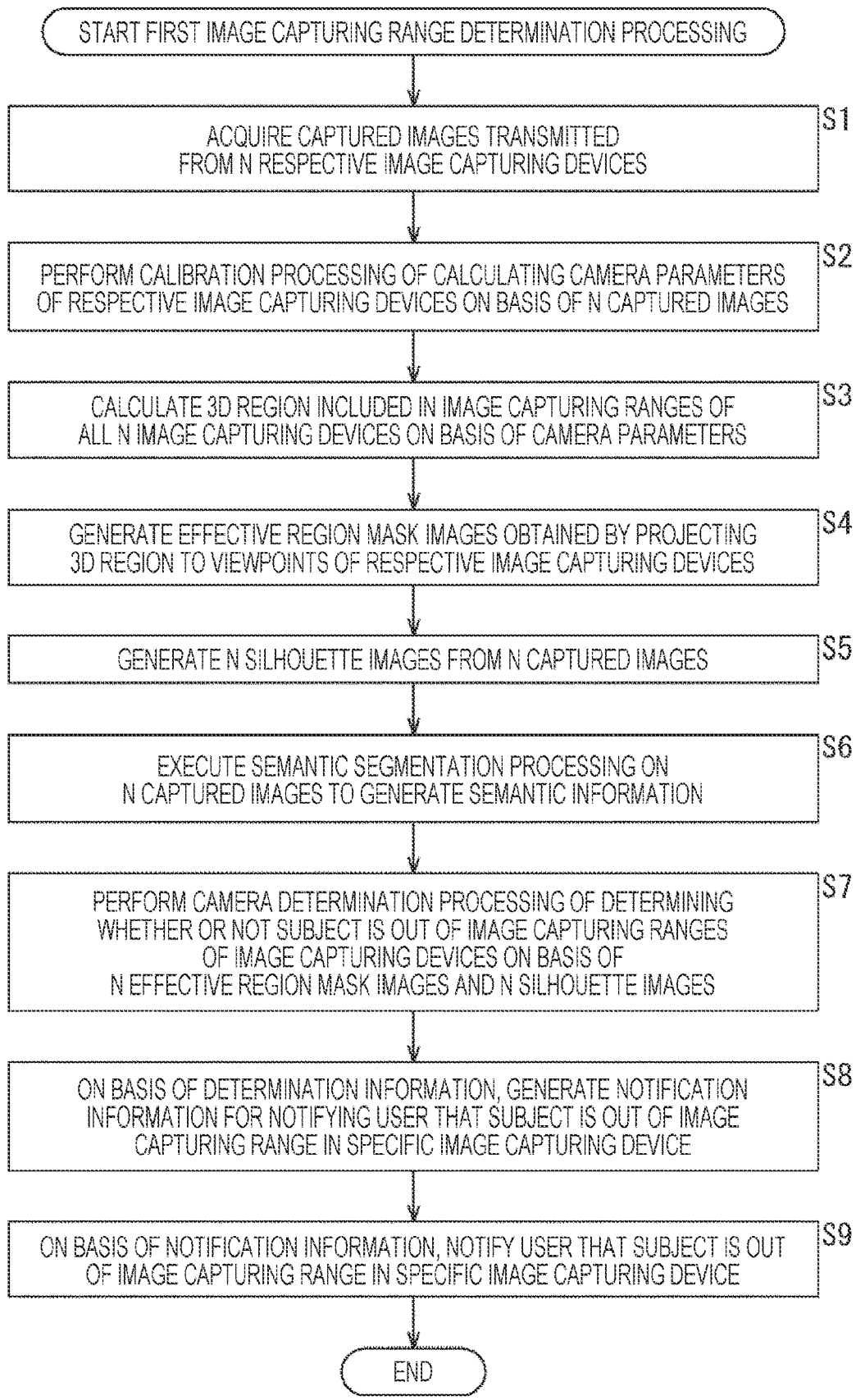
FIG. 9 is a flowchart describing first image capturing range determination processing.

The first image capturing range determination processing described with reference to FIG. 9 is repeatedly executed every time new captured images captured by the N image capturing devices CAM are input, but processing that is not changed in the update of the captured images can be appropriately omitted. For example, the calibration processing in step S2 and the processing of generating the effective region mask images in steps S3 and S4 are required to be executed only once at the first determination processing in a case where the positions and angles of view of the N image capturing devices CAM are not changed. Alternatively, the processing may be executed before image capturing for generating the 3D model is performed.

When the captured images captured by the N respective image capturing devices CAM are sequentially input into the image processing apparatus 11, 3D model generation processing by means of the 3D model calculation unit 38 is also executed in parallel with the above-described image capturing range determination processing. The image capturing range determination processing and the 3D model generation processing may be executed independently, or may be executed in cooperation. For example, in the image capturing range determination processing, the determination information indicating that the subject is out of the image capturing range of the image capturing device CAM may be supplied from the determination unit 36 to the 3D model calculation unit 38 as well, and in a case where the subject is out of the image capturing range of the image capturing device CAM, generation of the 3D model may be stopped or interrupted.

4. Second Embodiment of Image Processing Apparatus

Figure 10:
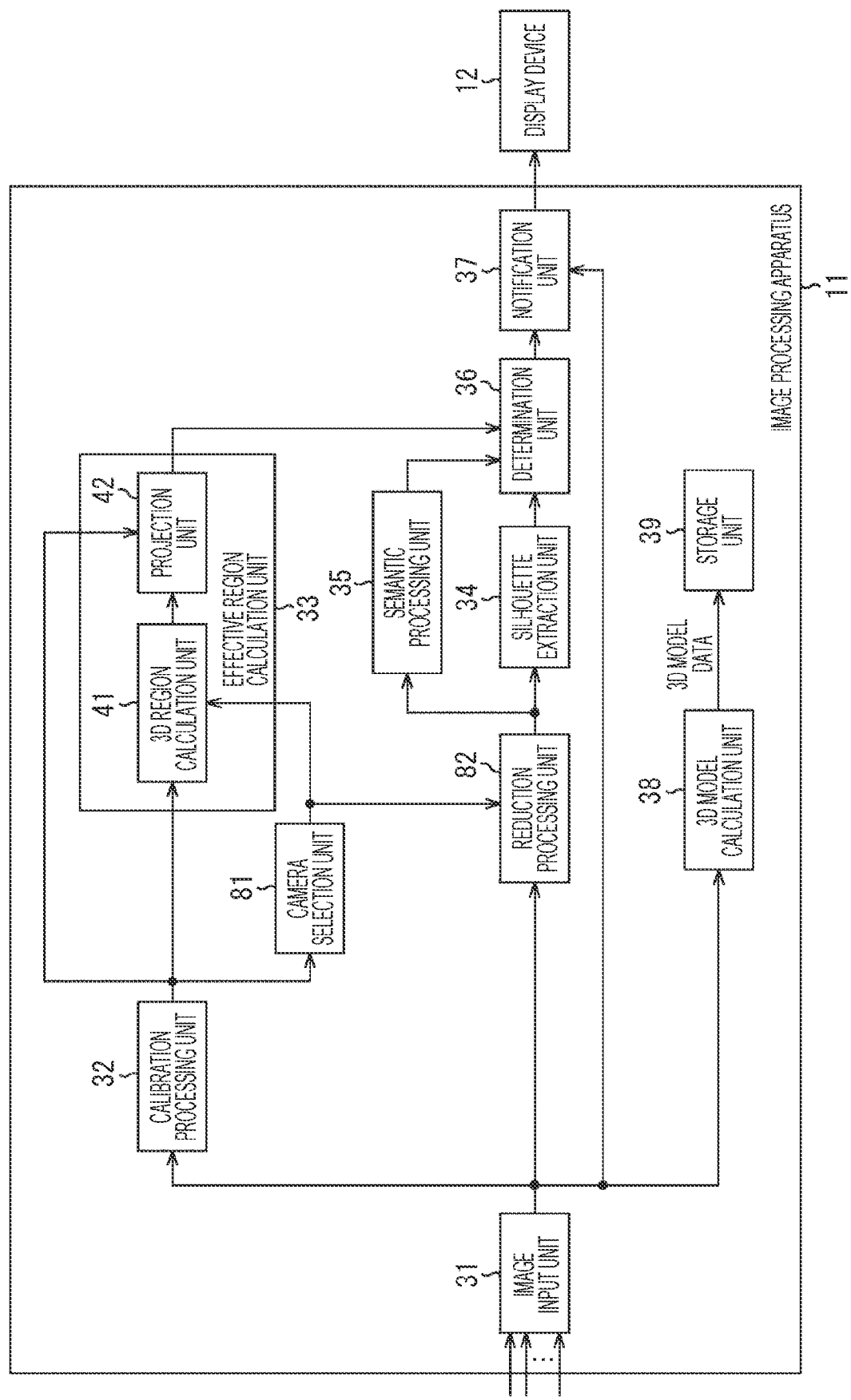
FIG. 10 is a block diagram illustrating a configuration example of a second embodiment of the image processing apparatus.

FIG. 10 is a block diagram illustrating a configuration example of a second embodiment of the image processing apparatus 11.

In FIG. 10, portions corresponding to those of the first embodiment illustrated in FIG. 3 are labeled with the same reference signs, and description of the portions will be omitted as appropriate.

While the image processing apparatus 11 according to the first embodiment described above has a configuration in which accuracy of determination as to whether or not the subject is out of the image capturing range of the image capturing device CAM is emphasized, the image processing apparatus 11 according to the second embodiment has a configuration of a case where a real-time processing property is emphasized.

In the second embodiment, the image processing apparatus 11 uses only captured images of M (N>M) image capturing devices CAM selected from among the N image capturing devices CAM to perform camera determination processing of determining whether or not the subject is out of the image capturing ranges of the image capturing devices CAM.

The image processing apparatus 11 according to the second embodiment in FIG. 10 is different from that according to the first embodiment in that a camera selection unit 81 and a reduction processing unit 82 are newly provided.

The camera selection unit 81 is supplied with the camera parameters of the respective image capturing devices CAM from the calibration processing unit 32.

The camera selection unit 81 selects M (N>M) image capturing devices CAM from among the N image capturing devices CAM. The camera selection unit 81 can select the devices manually by user's designation, or can select them automatically without user's designation.

In the case of manual selection, the camera selection unit 81 displays arrangement and angle-of-view information of the respective image capturing devices CAM on the display device 12 on the basis of the camera parameters of the respective image capturing devices CAM, and allows the user to designate M image capturing devices CAM to be used.

On the other hand, in the case of automatic selection, the camera selection unit 81 groups several image capturing devices CAM arranged to be close to each other on the basis of the camera parameters of the respective image capturing devices CAM to classify the N image capturing devices CAM into M groups. Then, the camera selection unit 81 selects one image capturing device CAM from each group to select M image capturing devices CAM to be used. Alternatively, in a case where the subject is a person, the camera selection unit 81 may set the image capturing device CAM in which the face of the person is captured as a reference image capturing device CAM, and sequentially select the image capturing device CAM at a position away from the reference image capturing device CAM and the image capturing device CAM at a position symmetrical to the selected image capturing device CAM until the number of image capturing devices CAM becomes M.

The camera selection unit 81 supplies camera selection information specifying the selected M image capturing devices CAM to the 3D region calculation unit 41 and the reduction processing unit 82 of the effective region calculation unit 33.

The 3D region calculation unit 41 of the effective region calculation unit 33 calculates a 3D region included in the image capturing ranges of the M image capturing devices CAM using the camera parameters of the M image capturing devices CAM selected in the camera selection unit 81. In the second embodiment, since the 3D region calculation processing using the N camera parameters according to the first embodiment is changed to the 3D region calculation processing using the M camera parameters, the processing load is reduced. Furthermore, by setting the resolution of points or vertices, the voxel size, and the like representing the three-dimensional shape of the object at the time of calculating the 3D region to coarser setting values than those in the first embodiment, the processing load may further be reduced.

The projection unit 42 generates M effective region mask images obtained by projecting the 3D region calculated in the 3D region calculation unit 41 onto the viewpoints of the M respective image capturing devices CAM. Furthermore, the projection unit 42 reduces the M generated effective region mask images in accordance with a reduction ratio of reduction processing executed by the reduction processing unit 82.

The reduction processing unit 82 selects M captured images corresponding to the M image capturing devices CAM selected in the camera selection unit 81 from among the N captured images captured by the N image capturing devices CAM supplied from the image input unit 31. Then, the reduction processing unit 82 generates low-resolution captured images (hereinafter referred to as low-resolution images) obtained by reducing the selected M captured images at a predetermined reduction ratio. For example, in a case where the captured image supplied from the image input unit 31 has a resolution of 1920×1080, which is called high definition (HD), or a 4K resolution, which is four times that of HD, the reduction processing unit 82 reduces the captured image to a low-resolution image of 640×480, which is called VGA. A method of the reduction processing is not particularly limited, and any method can be selected. For example, a nearest neighbor method, linear interpolation, bicubic method, area average method, or the like can be adopted. Furthermore, a method of simply thinning out the number of pixels in each of the horizontal direction and the vertical direction at a predetermined ratio such as ½ and ¼ may be used.

The reduction ratio of the reduction processing unit 82 and the reduction ratio when the projection unit 42 reduces the effective region mask image are set to be the same in advance.

The silhouette extraction unit 34, the semantic processing unit 35, and the determination unit 36 are similar to those of the first embodiment except that processing is performed on M images selected from N images and that the images have low resolution.

The other points of the second embodiment are similar to those of the first embodiment described above.

5. Second Image Capturing Range Determination Processing

Figure 11:
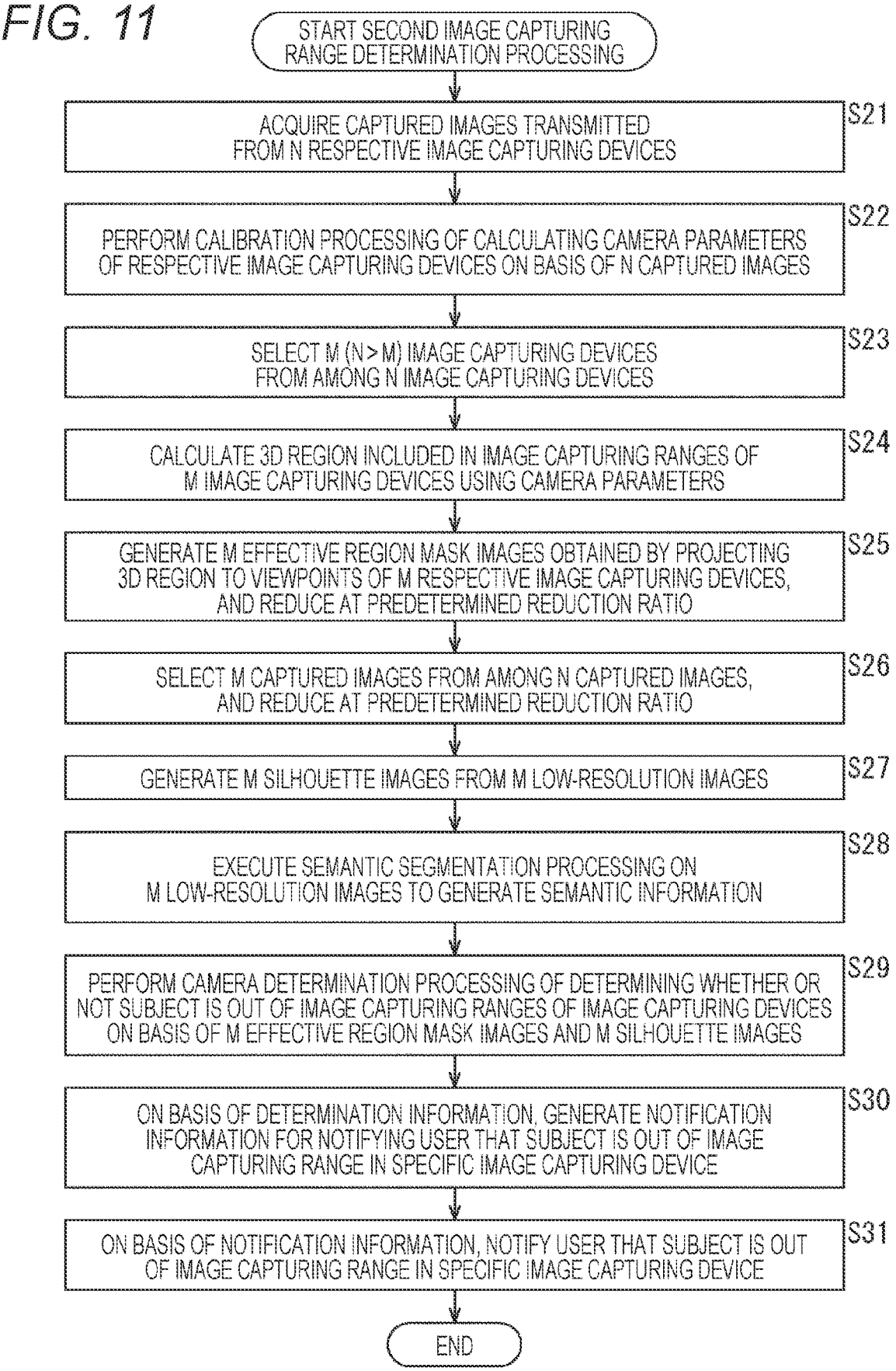
FIG. 11 is a flowchart describing second image capturing range determination processing.

Next, second image capturing range determination processing performed by the second embodiment of the image processing apparatus 11 will be described with reference to the flowchart in FIG. 11. This processing is started at the same time as start of image capturing in the N image capturing devices CAM, for example.

Since the processing in steps S21 and S22 is similar to that in steps S1 and S2 of the first image capturing range determination processing in FIG. 9, the description thereof will be omitted.

In step S23, the camera selection unit 81 selects M (N>M) image capturing devices CAM from among the N image capturing devices CAM. The camera selection unit 81 supplies camera selection information specifying the selected M image capturing devices CAM to the 3D region calculation unit 41 and the reduction processing unit 82 of the effective region calculation unit 33.

In step S24, a 3D region included in the image capturing ranges of the M image capturing devices CAM is calculated using the camera parameters of the M image capturing devices CAM selected in the camera selection unit 81.

In step S25, the projection unit 42 generates M effective region mask images obtained by projecting the 3D region calculated in the 3D region calculation unit 41 onto the viewpoints of the M respective image capturing devices CAM, and reduces the effective region mask images at a predetermined reduction ratio. The M effective region mask images after the reduction processing are supplied to the determination unit 36. Note that the projection unit 42 may generate the visual recognition camera information similarly to the first embodiment.

In step S26, the reduction processing unit 82 selects M captured images corresponding to the M image capturing devices CAM selected in the camera selection unit 81 from among the N captured images supplied from the image input unit 31, and reduces the M captured images at a predetermined reduction ratio. The M low-resolution images after the reduction are supplied to the silhouette extraction unit 34 and the semantic processing unit 35.

In step S27, the silhouette extraction unit 34 generates M silhouette images from the M low-resolution images supplied from the reduction processing unit 82. The M generated silhouette images are supplied to the determination unit 36.

In step S28, the semantic processing unit 35 executes semantic segmentation processing on the M low-resolution images supplied from the reduction processing unit 82 to generate semantic information, and supplies the semantic information to the determination unit 36. Note that this processing may be omitted in a case where the real-time processing property is particularly prioritized.

In step S29, the determination unit 36 performs camera determination processing of determining whether or not the subject is out of the image capturing ranges of the image capturing devices CAM on the basis of the M effective region mask images from the projection unit 42 and the M silhouette images from the determination unit 36. This processing is similar to the first image capturing range determination processing except that M effective region mask images and silhouette images are used instead of N effective region mask images and silhouette images.

Since steps S30 and S31 are similar to steps S8 and S9 of the first image capturing range determination processing in FIG. 9, the description thereof will be omitted.

At this time, the second image capturing range determination processing ends. According to the second image capturing range determination processing as well, since the user can be notified in a case where the subject is out of the image capturing ranges in the plurality of image capturing devices CAM capturing the subject, it is possible to reduce failed image capturing in multi-view image capturing for 3D model generation.

According to the second image capturing range determination processing, since the camera determination processing of determining whether or not the subject is out of the image capturing ranges of the image capturing devices CAM is performed using only the captured images of the N image capturing devices CAM among the M image capturing devices CAM, it is possible to reduce the processing load and improve the real-time processing property.

Note that, in the second embodiment, the processing unit that changes the resolution of the captured image to low resolution is provided in the image processing apparatus 11, but the resolution setting of the image capturing device CAM may be changed so that the captured image supplied from the image capturing device CAM has low resolution. In this case, the captured image used for the 3D model generation processing executed in parallel with the second image capturing range determination processing also has low resolution. In a case where it is desired to set the captured image used for the 3D model generation processing as a high-resolution image, the 3D model generation processing is only required to be executed in a time division manner so that the resolution setting of the image capturing device CAM is changed to a high-resolution setting after the image capturing range is confirmed in the second image capturing range determination processing.

6. Third Embodiment of Image Processing Apparatus

Figure 12:
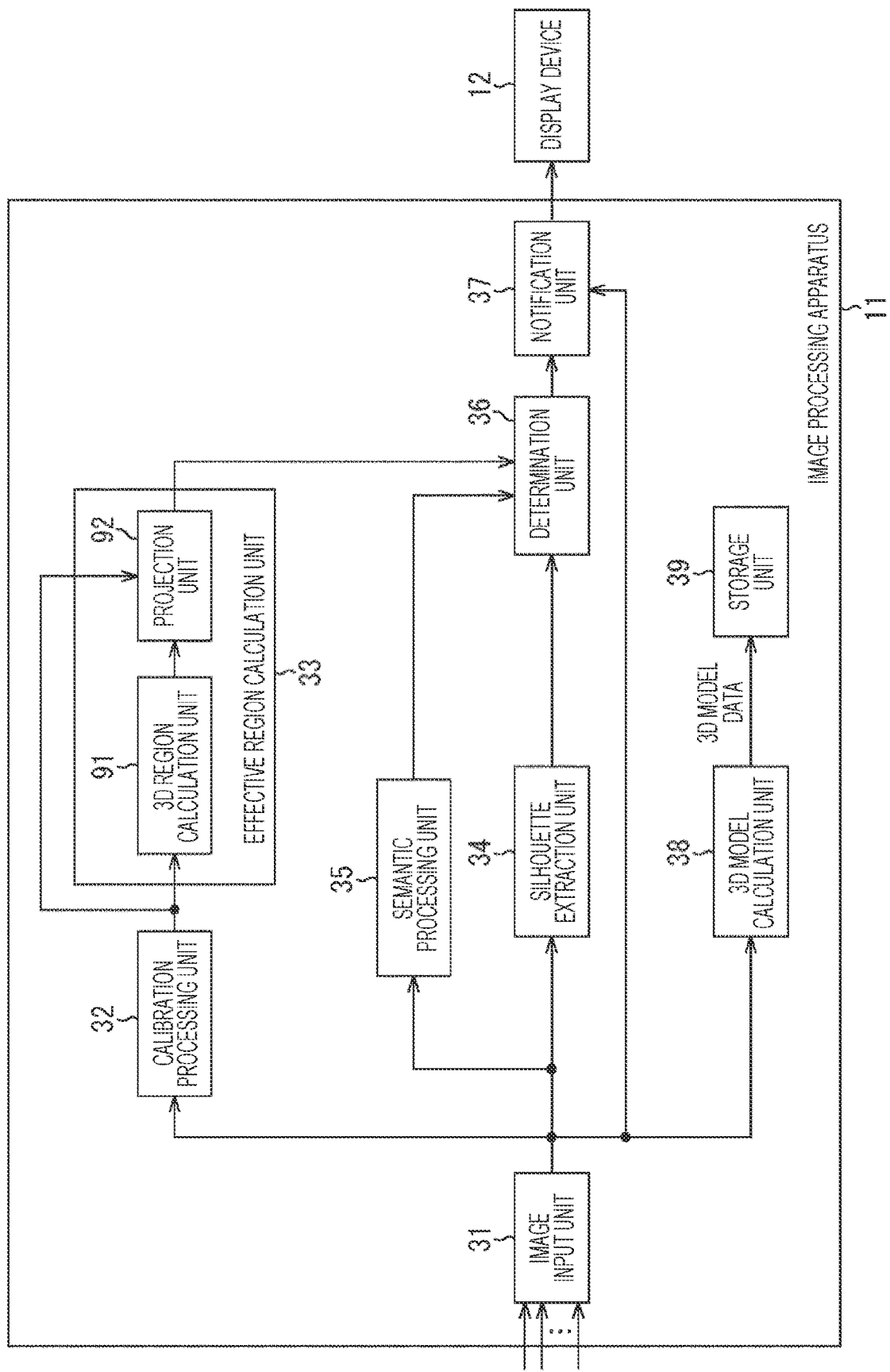
FIG. 12 is a block diagram illustrating a configuration example of a third embodiment of the image processing apparatus.

FIG. 12 is a block diagram illustrating a configuration example of a third embodiment of the image processing apparatus 11.

In FIG. 12, portions corresponding to those of the first embodiment illustrated in FIG. 3 are labeled with the same reference signs, and description of the portions will be omitted as appropriate.

The image processing apparatus 11 according to the third embodiment is common to the second embodiment in that it has a configuration in which arithmetic processing is reduced and a processing load is reduced. On the other hand, in the second embodiment, the processing itself in which the effective region calculation unit 33 generates the effective region mask images is not changed, and the number of the captured images and the resolution are changed, whereas the third embodiment is different from the second embodiment in that the processing in which the effective region calculation unit 33 generates the effective region mask images is changed.

When the configuration example of the third embodiment in FIG. 12 is compared with the configuration example of the first embodiment illustrated in FIG. 3, the 3D region calculation unit 41 and the projection unit 42 of the effective region calculation unit 33 in FIG. 3 are replaced with a 3D region calculation unit 91 and a projection unit 92 in FIG. 12, and the other configurations are the same.

Figure 13:
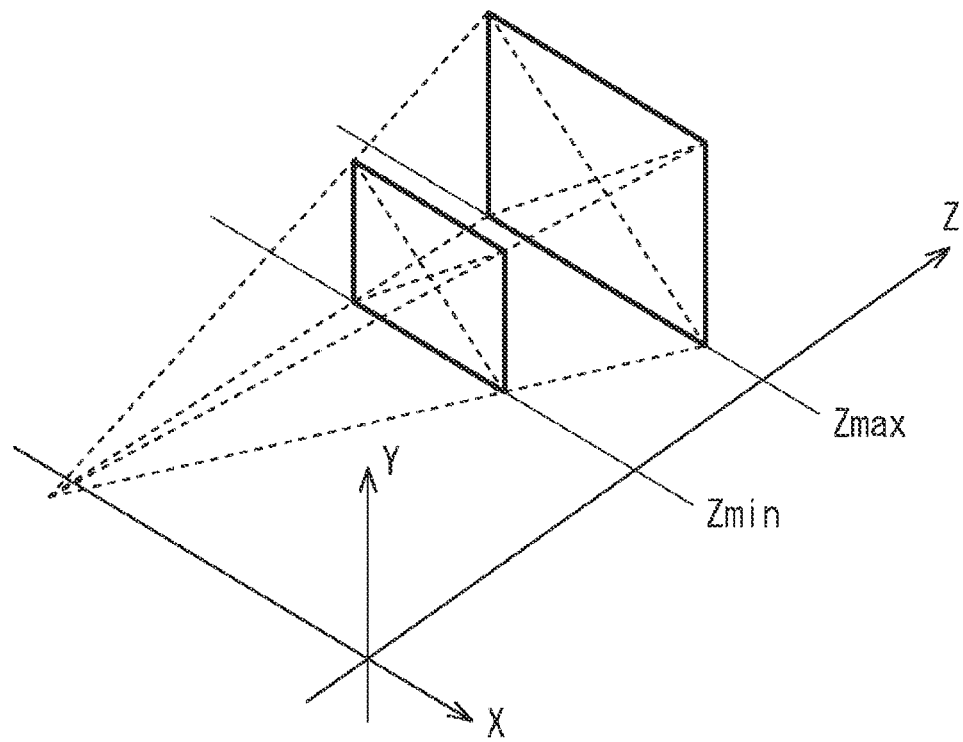
FIG. 13 is a diagram describing processing of a 3D region calculation unit according to the third embodiment.

As illustrated in FIG. 13, the 3D region calculation unit 91 calculates the image capturing range of each of the N image capturing devices CAM by approximating the image capturing range as a shape of a truncated quadrangular pyramid on the basis of the camera parameters supplied from the calibration processing unit 32. A range in the depth direction in FIG. 13 (Zmax and Zmin) is set (input) as parameters.

The 3D region calculation unit 91 calculates coordinates of eight vertices of a truncated quadrangular pyramid as the image capturing range of the image capturing device CAM for each of the image capturing devices CAM, and supplies the coordinates to the projection unit 92.

The projection unit 92 performs the following processing using each of the N image capturing devices CAM that generate the effective region mask images as a target camera.

The projection unit 92 projects the coordinates of the eight vertices of the truncated quadrangular pyramid of each of the N image capturing devices CAM supplied from the 3D region calculation unit 91 onto the viewpoint of the target camera to generate N truncated quadrangular pyramid projection regions obtained by projecting simple 3D regions of the N truncated quadrangular pyramids onto the projection plane of the target camera.

The processing of the projection unit 92 will be described with reference to FIGS. 14A, 14B, 14C, 14D, and 14E. In FIGS. 14A, 14B, 14C, 14D, and 14E, to facilitate understanding of the drawing, an example will be described in which the image capturing ranges of the two image capturing devices CAM-1 and CAM-2 are projected onto the viewpoint of the image capturing device CAM-3 assuming that the target camera is the image capturing device CAM-3.

Figure 14A:
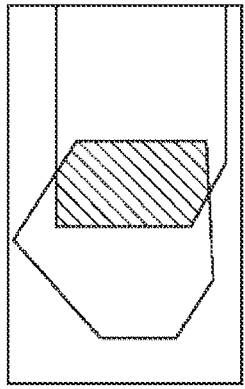
FIGS. 14A, 14B, 14C, 14D, and 14E are diagrams describing processing of a projection unit according to the third embodiment.

FIG. 14A illustrates a state in which the image capturing range of the image capturing device CAM-1 is viewed from the viewpoint of the image capturing device CAM-3 serving as the target camera. This state can be generated by projecting the image capturing range of the image capturing device CAM-1 onto the viewpoint of the image capturing device CAM-3 serving as the target camera.

Figure 14B:
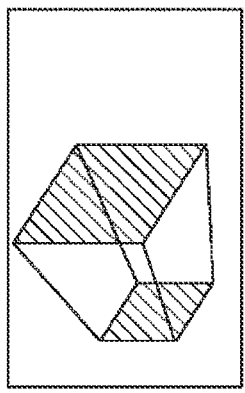

FIG. 14B illustrates a state in which the image capturing range of the image capturing device CAM-2 is viewed from the viewpoint of the image capturing device CAM-3 serving as the target camera. This state can be generated by projecting the image capturing range of the image capturing device CAM-2 onto the viewpoint of the image capturing device CAM-3 serving as the target camera.

Subsequently, the projection unit 92 generates an effective region mask image in which a region where all the N truncated quadrangular pyramid projection regions overlap is set as a projection 3D region of the target camera.

Figure 14C:
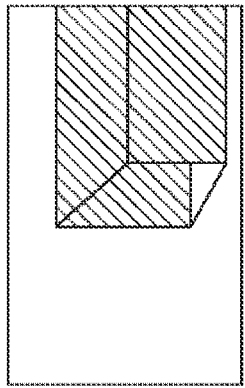

FIG. 14C illustrates a conceptual diagram of an effective region mask image generated by causing the image capturing range of the image capturing device CAM-1 and the image capturing range of the image capturing device CAM-2 to overlap.

The effective region mask image in FIG. 14C corresponds to the effective region mask image 52 illustrated in FIG. 5 in the first embodiment, and is actually a binary image similarly to the effective region mask image 52 in FIG. 5. In FIG. 14C, the hatched region is a region where the image capturing range of the image capturing device CAM-1 and the image capturing range of the image capturing device CAM-2 overlap, and corresponds to the projection 3D region 53 of the target camera.

In the third embodiment as well, the projection unit 92 can generate the visual recognition camera information. The visual recognition camera information in the third embodiment includes number information indicating the number of image capturing devices CAM from which the projection plane (image capturing range) of the target camera is visible, and camera information indicating the image capturing device CAM from which the projection plane (image capturing range) of the target camera is visible.

Figure 14D:
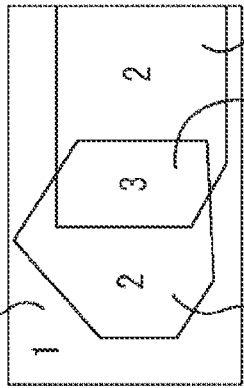

FIG. 14D illustrates an example of the number information indicating the number of image capturing devices CAM from which the image capturing range of the target camera is visible.

In FIG. 14D, the image capturing range of the target camera is divided into four regions 101 to 104, and the number information corresponding to the projection states in of FIGS. 14A, 14B, and 14C is stored for each of the regions 101 to 104.

Since the region 101 is a region that only the image capturing device CAM-3, which is the target camera, views, the number information is "1". Since the region 102 is a region that two devices, the image capturing device CAM-3 and the image capturing device CAM-2, view, the number information is "2". Since the region 103 is a region that the image capturing devices CAM-1 to CAM-3 view, the number information is "3". Since the region 104 is a region that two devices, the image capturing device CAM-1 and the image capturing device CAM-3, view, the number information is "2".

Figure 14E:
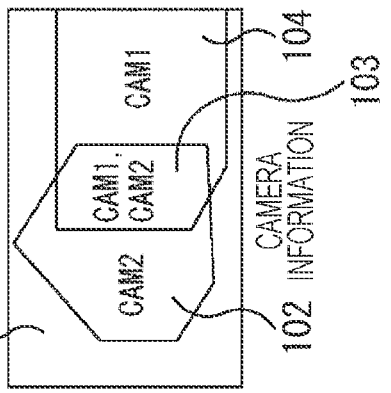

FIG. 14E illustrates an example of the camera information indicating the image capturing device CAM from which the image capturing range of the target camera is visible.

In FIG. 14E, the image capturing range of the image capturing device CAM-3 as the target camera is divided into four regions 101 to 104, and the camera information corresponding to the projection states in FIGS. 14A, 14B, and 14C is stored for each of the regions 101 to 104.

Note that, since the regions are obviously visible from the self-image capturing device CAM, only information indicating if the regions are visible from other image capturing devices CAM is recorded as the camera information.

Since the region 101 is a region that only the image capturing device CAM-3 views, the region 101 has no camera information. As for the region 102, camera information indicating that the region 102 is viewed from the image capturing device CAM-2, other than the self-device, is recorded. As for the region 103, camera information indicating that the region 103 is viewed from the image capturing devices CAM-1 and CAM-2, other than the self-device, is recorded. As for the region 104, camera information indicating that the region 104 is viewed from the image capturing device CAM-1, other than the self-device, is recorded.

Other points of the third embodiment are similar to those of the first embodiment described above.

7. Third Image Capturing Range Determination Processing

In third image capturing range determination processing performed by the third embodiment of the image processing apparatus 11, steps S3 and S4 of the first image capturing range determination processing described with reference to FIG. 9 are replaced with the following steps S3' and S4'.

In step S3', the 3D region calculation unit 91 calculates the image capturing range of each of the N image capturing devices CAM by approximating the image capturing range as a truncated quadrangular pyramid on the basis of the camera parameters supplied from the calibration processing unit 32.

In step S4', the projection unit 92 performs the following processing using each of the N image capturing devices CAM that generate the effective region mask images as a target camera. The projection unit 92 projects the coordinates of the eight vertices of the truncated quadrangular pyramid of each of the N image capturing devices CAM supplied from the 3D region calculation unit 91 onto the viewpoint of the target camera to generate N truncated quadrangular pyramid projection regions obtained by projecting simple 3D regions of the N truncated quadrangular pyramids onto the projection plane of the target camera. Subsequently, the projection unit 92 generates an effective region mask image in which a region where all the N truncated quadrangular pyramid projection regions overlap is set as a projection 3D region of the target camera.

Therefore, in the first image capturing range determination processing, the effective region calculation unit 33 calculates the image capturing ranges, each formed in the shape of the truncated quadrangular pyramid, of the N respective image capturing devices CAM, integrates all the N image capturing ranges to calculate the 3D region, and then projects the integrated 3D region onto the viewpoint of each of the image capturing devices CAM to generate the effective region mask image of the target camera. That is, the effective region calculation unit 33 of the first embodiment performs processing in the order of calculation of the N image capturing ranges, integration, and projection.

On the other hand, in the third image capturing range determination processing, the effective region calculation unit 33 calculates the image capturing ranges, each formed in the shape of the truncated quadrangular pyramid, of the N respective image capturing devices CAM, projects the image capturing ranges onto the viewpoints of the respective image capturing devices CAM to generate N truncated quadrangular pyramid projection regions, and integrates the N projected truncated quadrangular pyramid projection regions as the projection 3D region of the target camera to generate the effective region mask image. That is, the effective region calculation unit 33 of the third embodiment performs processing in the order of calculation of the N image capturing ranges, projection, and integration.

It can be said that the 3D region calculation unit 41 of the first embodiment is a generation unit that generates one 3D region into which the image capturing ranges of the N image capturing devices CAM are integrated from N captured images (a plurality of multi-view images) of the N respective image capturing devices CAM.

It can be said that the 3D region calculation unit 91 of the third embodiment is a generation unit that generates N 3D regions of the N respective image capturing devices CAM from N captured images (a plurality of multi-view images) of the N respective image capturing devices CAM.

According to the third image capturing range determination processing as well, since the user can be notified in a case where the subject is out of the image capturing ranges in the plurality of image capturing devices CAM capturing the subject, it is possible to reduce failed image capturing in multi-view image capturing for 3D model generation.

8. Other Examples of Camera Arrangement

In each of the above-described embodiments, as illustrated in FIG. 1, it has been described that the N image capturing devices CAM are arranged on the outer periphery of the subject so as to surround the subject, but the arrangement of the image capturing devices CAM is not limited thereto.

Figure 15B:
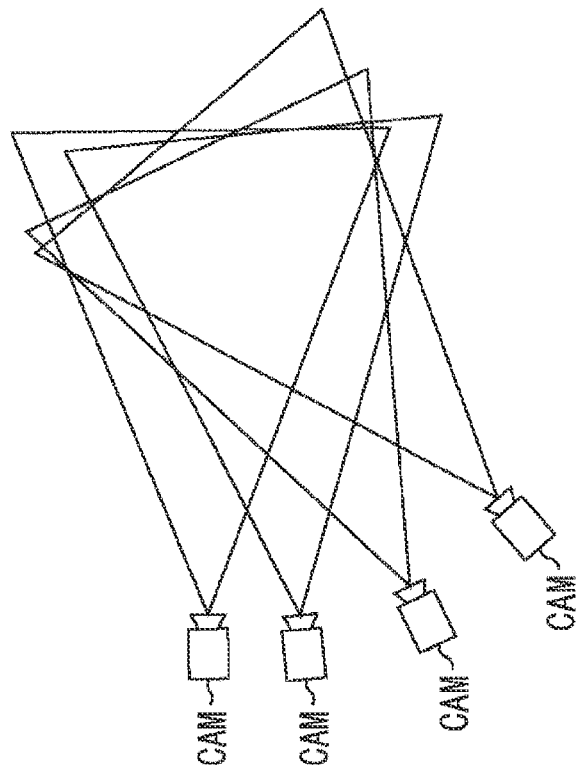
FIGS. 15A and 15B are diagrams illustrating other examples of camera arrangement.
Figure 15A:
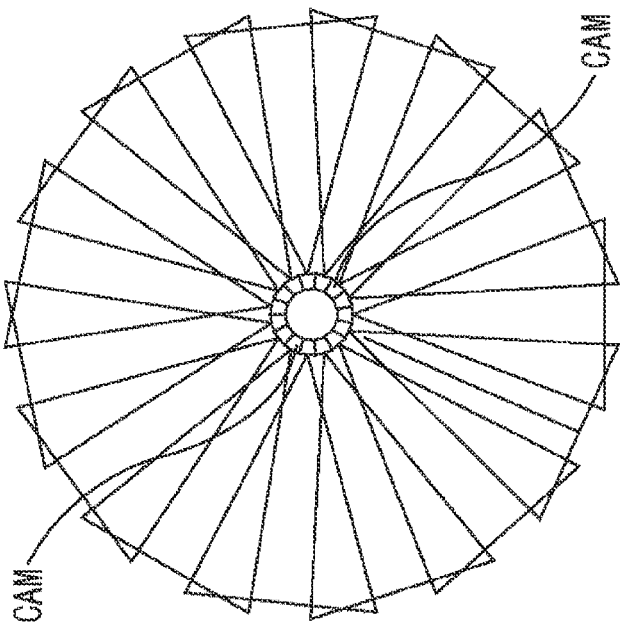

For example, as illustrated in FIG. 15A, a plurality of image capturing devices CAM may be arranged so as to face outward, or as illustrated in FIG. 15B, a plurality of image capturing devices CAM may be arranged so as to face in a specific direction in a focused manner as in a stage of a concert hall.

9. Configuration Example of Computer

The series of pieces of processing described above can be executed by hardware or software. In a case where the series of pieces of processing is executed by software, a program including the software is installed in a computer. Here, the computer includes a microcomputer incorporated in dedicated hardware, a general-purpose personal computer capable of executing various functions by installing various programs, and the like, for example.

FIG. 16 is a block diagram illustrating a configuration example of hardware of a computer that executes the above-described series of pieces of processing by means of a program.

In the computer, a central processing unit (CPU) 301, a read only memory (ROM) 302, and a random access memory (RAM) 303 are mutually connected by a bus 304.

An input/output interface 305 is further connected to the bus 304. An input unit 306, an output unit 307, a storage unit 308, a communication unit 309, and a drive 310 are connected to the input/output interface 305.

The input unit 306 includes a keyboard, a mouse, a microphone, a touch panel, an input terminal, and the like. The output unit 307 includes a display, a loudspeaker, an output terminal, and the like. The storage unit 308 includes a hard disk, a RAM disk, a non-volatile memory, and the like. The communication unit 309 includes a network interface and the like. The drive 310 drives a removable recording medium 311 such as a magnetic disk, an optical disk, a magneto-optical disk, and a semiconductor memory.

In the computer configured as described above, for example, the CPU 301 loads a program stored in the storage unit 308 into the RAM 303 via the input/output interface 305 and the bus 304 and executes the program to cause the above-described series of pieces of processing to be performed. The RAM 303 also appropriately stores data and the like necessary for the CPU 301 to execute various kinds of processing.

The program executed by the computer (CPU 301) can be provided by being recorded in the removable recording medium 311 as a package medium or the like, for example. Furthermore, the program can be provided via a wired or wireless transmission medium such as a local area network, the Internet, and digital satellite broadcasting.

In the computer, the program can be installed in the storage unit 308 via the input/output interface 305 by attaching the removable recording medium 311 to the drive 310. Furthermore, the program can be received in the communication unit 309 via a wired or wireless transmission medium and installed in the storage unit 308. In addition, the program can be installed in the ROM 302 or the storage unit 308 in advance.

Note that, in the present description, the steps described in the flowcharts may be executed in chronological order according to the described order, or do not necessarily have to be executed in chronological order, and may be executed in parallel or at a necessary time such as at a time when calling is performed.

In the present description, the system means a set of a plurality of components (devices, modules (parts), and the like), and it does not matter whether or not all the components are in the same housing. Therefore, both a set of a plurality of devices housed in separate housings and connected via a network and a device having a plurality of modules housed in one housing are systems.

The embodiments of the present technology are not limited to the aforementioned embodiments, and various changes can be made without departing from the scope of the present technology.

For example, a mode in which all or some of the plurality of embodiments described above are combined can be employed.

For example, the present technology can be configured as cloud computing in which one function is shared and jointly processed by a plurality of devices via a network.

Furthermore, each step described in the above-mentioned flowcharts can not only be executed by one device but can also be shared and executed by a plurality of devices.

Moreover, in a case where one step includes a plurality of pieces of processing, the plurality of pieces of processing included in the step can not only be executed by one device but can also be shared and executed by a plurality of devices.

Note that effects described in the present description are illustrative only and shall not be limited, and effects other than those described in the present description may exist.

Note that the present technology can employ the following configuration.

(1)

An image processing apparatus including:
a generation unit that generates a 3D region of image capturing ranges generated from a plurality of multi-view images; and
a determination unit that determines a situation in which an image capturing device captures a subject on the basis of a region image obtained by projecting the 3D region onto a specific viewpoint and a subject image from the image capturing device corresponding to the specific viewpoint.

(2)

The image processing apparatus according to the above (1),
in which the determination unit uses the region image and the subject image as a pair to determine whether or not the subject is out of image capturing ranges of a plurality of the image capturing devices that have captured the plurality of multi-view images.

(3)

The image processing apparatus according to the above (1) or (2),
in which the determination unit uses the region image and the subject image as a pair to determine whether or not the subject is about to be out of image capturing ranges of a plurality of the image capturing devices that have captured the plurality of multi-view images.

(4)

The image processing apparatus according to the above (2) or (3),
in which, in a case where the subject is out of the image capturing ranges of the plurality of the image capturing devices, the determination unit also determines the subject is out of an image capturing range of which image capturing device.

(5)

The image processing apparatus according to any one of the above (1) to (4),
in which the determination unit uses the subject image to determine whether or not the subject is out of an image capturing range of the image capturing device corresponding to the specific viewpoint.

(6)

The image processing apparatus according to any one of the above (1) to (5), further including
a semantic processing unit that identifies semantic information of the subject,
in which the determination unit uses the semantic information of the subject for determination.

(7)

The image processing apparatus according to any one of the above (1) to (6), further including
a calculation unit that calculates camera parameters of a plurality of the image capturing devices that have captured the plurality of multi-view images on the basis of the plurality of multi-view images,
in which the generation unit generates the 3D region of the image capturing ranges on the basis of the calculated camera parameters of the plurality of the image capturing devices.

(8)

The image processing apparatus according to the above (7),
  in which the generation unit generates one 3D region which is the 3D region included in the image capturing ranges of all the image capturing devices that have captured the plurality of multi-view images.

(9)

The image processing apparatus according to any one of the above (1) to (8), further including
  a projection unit that generates the region image obtained by projecting the 3D region onto the specific viewpoint.

(10)

The image processing apparatus according to any one of the above (1) to (9),
  in which the region image is a binary image.

(11)

The image processing apparatus according to any one of the above (1) to (10), further including
  a silhouette extraction unit that generates a silhouette image obtained by extracting a region of the subject in silhouette from each of the plurality of multi-view images,
  in which the determination unit determines the situation in which the image capturing device captures the subject on the basis of the region image and the silhouette image as the subject image.

(12)

The image processing apparatus according to any one of the above (1) to (11), further including
  a selection unit that selects several image capturing devices from among a plurality of image capturing devices corresponding to the plurality of multi-view images,
  in which the generation unit generates the 3D region of the image capturing ranges generated from multi-view images corresponding to the selected several image capturing devices, and
  the situation in which the image capturing device captures the subject is determined on the basis of the region image obtained by projecting the 3D region onto the specific viewpoint and the subject image from the image capturing device corresponding to the specific viewpoint.

(13)

The image processing apparatus according to any one of the above (1) to (12), further including
  a reduction processing unit that reduces the plurality of multi-view images at a predetermined reduction ratio,
  in which the determination unit determines the situation in which the image capturing device captures the subject on the basis of the region image and the subject image after reduction.

(14)

The image processing apparatus according to any one of the above (1) to (13),
  in which the generation unit generates a plurality of the 3D regions obtained by approximating respective image capturing ranges of a plurality of image capturing devices corresponding to the plurality of multi-view images, and
  the determination unit determines the situation in which the image capturing device captures the subject on the basis of the region image obtained by projecting the plurality of the 3D regions onto the specific viewpoint and the subject image from the image capturing device corresponding to the specific viewpoint.

(15)

The image processing apparatus according to the above (14),
  in which the 3D region has a shape of a truncated quadrangular pyramid.

(16)

The image processing apparatus according to any one of the above (1) to (15), further including
  a notification unit that notifies a user of a determination result of the determination unit.

(17)

The image processing apparatus according to the above (16),
  in which the notification unit refers to the determination result stored in a predetermined storage unit and notifies the user of the determination result.

(18)

A 3D model generation method for generating a 3D model of a subject, including:
  generating a 3D region of image capturing ranges generated from a plurality of multi-view images;
  determining a situation in which an image capturing device captures the subject on the basis of a region image obtained by projecting the 3D region onto a specific viewpoint and a subject image from the image capturing device corresponding to the specific viewpoint; and
  generating the 3D model of the subject on the basis of the plurality of multi-view images.

(19)

A program for causing a computer to function as
  a generation unit that generates a 3D region of image capturing ranges generated from a plurality of multi-view images, and
  a determination unit that determines a situation in which an image capturing device captures a subject on the basis of a region image obtained by projecting the 3D region onto a specific viewpoint and a subject image from the image capturing device corresponding to the specific viewpoint.

REFERENCE SIGNS LIST

CAM-1 to CAM-8 Image capturing device
11 Image processing apparatus
12 Display device
31 Image input unit
32 Calibration processing unit
33 Effective region calculation unit
34 Silhouette extraction unit
35 Semantic processing unit
36 Determination unit
37 Notification unit
38 3D model calculation unit
41 3D region calculation unit
42 Projection unit
81 Camera selection unit
82 Reduction processing unit
91 3D region calculation unit
92 Projection unit
301 CPU
302 ROM
303 RAM
306 Input unit
307 Output unit 308 Storage unit
309 Communication unit
310 Drive

The invention claimed is:

1. An image processing apparatus, comprising:
an image input unit configured to acquire a plurality of multi-view images of a subject from a plurality of image capturing devices, wherein
the plurality of image capturing devices captures the plurality of multi-view images from a plurality of viewpoints,
the plurality of multi-view images includes a subject image, and
the subject image is captured by a first image capturing device, of the plurality of image capturing devices, from a specific viewpoint of the plurality of viewpoints;
a generation unit configured to:
generate a plurality of image capturing ranges of the plurality of image capturing devices based on the plurality of multi-view images; and
generate a first 3D region of the plurality of image capturing ranges based on the plurality of multi-view images;
a projection unit configured to:
project the first 3D region onto the specific viewpoint; and
generate a first region image based on the projected first 3D region; and
a determination unit configured to determine that the subject is out of the plurality of image capturing ranges based on each of:
the generated first region image, and
the subject image.

2. The image processing apparatus according to claim 1, wherein the determination unit is further configured to determine, based on each of the generated first region image and the subject image, that a position of the subject is out of the plurality of image capturing ranges.

3. The image processing apparatus according to claim 1, wherein
the plurality of image capturing ranges includes an image capturing range of a second image capturing device of the plurality of image capturing devices, and
the determination unit is further configured to determine, based on the determination that the subject is out of the plurality of image capturing ranges, that the subject is out of the image capturing range of the second image capturing device.

4. The image processing apparatus according to claim 1, wherein
the plurality of image capturing ranges includes an image capturing range of the first image capturing device, and
the determination unit is further configured to determine, based on the subject image, that the subject is out of the image capturing range of the first image capturing device.

5. The image processing apparatus according to claim 1, further comprising a semantic processing unit configured to identify semantic information of the subject, wherein the determination unit is further configured to determine, based on the semantic information of the subject, that the subject is out of the plurality of image capturing ranges.

6. The image processing apparatus according to claim 1, further comprising a calculation unit configured to calculate camera parameters of the plurality of image capturing devices based on the plurality of multi-view images.

7. The image processing apparatus according to claim 6, wherein the generation unit is further configured to generate the first 3D region of the plurality of image capturing ranges based on the calculated camera parameters of the plurality of image capturing devices.

8. The image processing apparatus according to claim 1, wherein the first region image is a binary image.

9. The image processing apparatus according to claim 1, further comprising a silhouette extraction unit configured to:
extract a region of the subject from each of the plurality of multi-view images; and
generate a silhouette image based on the extracted region of the subject, wherein the determination unit is further configured to determine that the subject is out of the plurality of image capturing ranges based on each of the first region image and the silhouette image.

10. The image processing apparatus according to claim 1, further comprising a selection unit configured to select a set of image capturing devices from the plurality of image capturing devices, wherein
the generation unit is further configured to:
generate a set of image capturing ranges of the plurality of image capturing ranges based on a set of multi-view images, of the plurality of multi-view images, corresponding to the selected set of image capturing devices; and
generate a second 3D region of the set of image capturing ranges,
the projection unit is further configured to:
project the second 3D region onto the specific viewpoint; and
generate a second region image based on the projected second 3D region, and
the determination unit is further configured to determine that the subject is out of the plurality of image capturing ranges based on each of:
the second region image, and
the subject image.

11. The image processing apparatus according to claim 1, further comprising a reduction processing unit configured to reduce a resolution of each of the plurality of multi-view images at a determined reduction ratio to obtain a plurality of low-resolution images, wherein
the plurality of low-resolution images includes a low-resolution subject image corresponding to the first image capturing device, and
the determination unit is further configured to determine that the subject is out of the plurality of image capturing ranges based on each of:
the first region image, and
the low-resolution subject image.

12. The image processing apparatus according to claim 1, wherein
the generation unit is further configured to generate a plurality of 3D regions based on the plurality of image capturing ranges of the plurality of image capturing devices,
the plurality of 3D regions includes the first 3D region,
the projection unit is further configured to:
project the plurality of 3D regions onto the specific viewpoint; and
generate a second region image based on the projected plurality of 3D regions, and
the determination unit is further configured to determine that the subject is out of the plurality of image capturing ranges based on each of:

the second region image, and
the subject image.

13. The image processing apparatus according to claim 12, wherein each 3D region of the plurality of 3D regions has a shape of a truncated quadrangular pyramid.

14. The image processing apparatus according to claim 1, further comprising a notification unit configured to notify a user of a determination result of the determination unit.

15. The image processing apparatus according to claim 14, further comprising a storage unit configured to store the determination result of the determination unit, wherein the notification unit is further configured to:
   refer to the stored determination result; and
   notify the user of the referred determination result.

16. A 3D model generation method for generating a 3D model of a subject, comprising:
   acquiring a plurality of multi-view images of the subject from a plurality of image capturing devices, wherein
      the plurality of image capturing devices captures the plurality of multi-view images from a plurality of viewpoints,
      the plurality of multi-view images includes a subject image, and
      the subject image is captured by a first image capturing device, of the plurality of image capturing devices, from a specific viewpoint of the plurality of viewpoints;
   generating a plurality of image capturing ranges of the plurality of image capturing devices based on the plurality of multi-view images;
   generating a 3D region of the plurality of image capturing ranges based on the plurality of multi-view images;
   projecting the 3D region onto the specific viewpoint;
   generating a region image based on the projected 3D region;
   determining that the subject is out of the plurality of image capturing ranges based on each of:
      the generated region image, and
      the subject image; and
   generating the 3D model of the subject based on the plurality of multi-view images.

17. A non-transitory computer-readable medium having stored thereon computer-executable instructions that, when executed by computer, cause the computer to execute operations, the operations comprising:
   acquiring a plurality of multi-view images of a subject from a plurality of image capturing devices, wherein
      the plurality of image capturing devices captures the plurality of multi-view images from a plurality of viewpoints,
      the plurality of multi-view images includes a subject image, and
      the subject image is captured by a first image capturing device, of the plurality of image capturing devices, from a specific viewpoint of the plurality of viewpoints;
   generating a plurality of image capturing ranges of the plurality of image capturing devices based on the plurality of multi-view images;
   generating a 3D region of the plurality of image capturing ranges based on the plurality of multi-view images;
   projecting the 3D region onto the specific viewpoint;
   generating a region image based on the projected 3D region; and
   determining that the subject is out of the plurality of image capturing ranges based on each of:
      the generated region image, and
      the subject image.

* * * * *